United States Patent
Ito et al.

(10) Patent No.: US 11,053,265 B2
(45) Date of Patent: Jul. 6, 2021

(54) OPTICALLY ACTIVE SUBSTITUTED 2,3-BISPHOSPHINOQUINOXALINES AND PROCESSES FOR PRODUCING THE SAME

(71) Applicants: Nippon Chemical Industrial Co., Ltd., Tokyo (JP); NATIONAL UNIVERSITY CORPORATION HOKKAIDO UNIVERSITY, Sapporo (JP)

(72) Inventors: Hajime Ito, Sapporo (JP); Hiroaki Iwamoto, Sapporo (JP); Tsuneo Imamoto, Tokyo (JP); Ken Tamura, Tokyo (JP)

(73) Assignees: NIPPON CHEMICAL INDUSTRIAL CO., LTD., Tokyo (JP); NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 0 days.

(21) Appl. No.: 16/641,845

(22) PCT Filed: Sep. 28, 2018

(86) PCT No.: PCT/JP2018/036440
§ 371 (c)(1),
(2) Date: Feb. 25, 2020

(87) PCT Pub. No.: WO2019/069828
PCT Pub. Date: Apr. 11, 2019

(65) Prior Publication Data
US 2020/0377536 A1    Dec. 3, 2020

(30) Foreign Application Priority Data

Oct. 6, 2017  (JP) ............................. JP2017-195879
Jun. 22, 2018 (JP) ............................. JP2018-119159

(51) Int. Cl.
| C07D 241/44 | (2006.01) |
| C07F 9/6509 | (2006.01) |
| B01J 31/24  | (2006.01) |
| C07F 5/02   | (2006.01) |

(52) U.S. Cl.
CPC ..... *C07F 9/650994* (2013.01); *B01J 31/2452* (2013.01); *C07F 5/027* (2013.01); *B01J 2231/323* (2013.01); *B01J 2531/16* (2013.01); *C07B 2200/07* (2013.01)

(58) Field of Classification Search
CPC .................................................. C07D 241/44
USPC ........................................................ 544/353
See application file for complete search history.

(56) References Cited

U.S. PATENT DOCUMENTS

2007/0021610 A1    1/2007  Imamoto et al.

FOREIGN PATENT DOCUMENTS

| JP | 2000-319288 A | 11/2000 |
| JP | 2011-219413 A | 11/2011 |

OTHER PUBLICATIONS

International Search Report dated Nov. 13, 2018, issued in counterpart International Application No. PCT/JP2018/036440. (3 pages).
Zhang et a., "Three-Hindered Quadrant Phosphine Ligands with an Aromatic Ring Backbone for the Rhodium-Catalyzed Asymmetric Hydrogenation of Functionalized Alkenes", The Journal of Organic Chemistry, (2012), pp. 11934-11935, 77. Cited in Specification & ISR. (5 pages).
Liu et al., "A new and convenient approach for the synthesis of P-stereogenic intermediates bearing a tert-butyl (methyl)phosphino group", Research on Chemical Intermediates, Apr. 7, 2017, pp. 4959-4966, 43 (8). Cited in ISR. (8 pages).
Imamoto et al., "An Air-Stable P-Chiral Phosphine Ligand for Highly Enantioselective Transition-Metal-Catalyzed Reactions", Journal of the American Chemical Society, (2005), pp. 11934-11935, 127. Cited in ISR. (2 pages).
Imamoto et al., "Air-Stable P-Chiral Bidentate Phosphine Ligand with (1-Adamanty)methylphosphino Group", Chemistry Letters, (2007), pp. 500-501, vol. 36, No. 4. Cited in ISR. (4 pages).

(Continued)

*Primary Examiner* — Douglas M Willis
(74) *Attorney, Agent, or Firm* — Westerman, Hattori, Daniels & Adrian, LLP

(57) ABSTRACT

An optically active 2,3-bisphosphinopyrazine derivative represented by the following general formula (1):

[Formula 1]

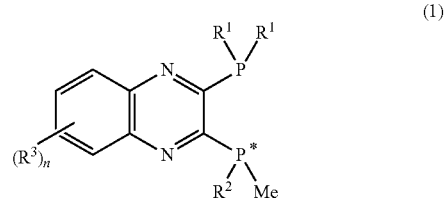

(1)

wherein $R^1$ represents a group selected from a branched alkyl group having 3 or more carbon atoms, an adamantyl group, an optionally substituted cycloalkyl group, and an optionally substituted aryl group; $R^2$ represents a group selected from a branched alkyl group having 3 or more carbon atoms, an adamantyl group, and an optionally substituted cycloalkyl group, provided that when $R^1$ is a tert-butyl group, $R^1$ and $R^2$ are not the same; $R^3$ represents a monovalent substituent; n represents an integer of 0 to 4; and * represents an asymmetric center on a phosphorus atom.

5 Claims, No Drawings

(56) References Cited

OTHER PUBLICATIONS

Hoge et al., "Highly Selective Asymmetric Hydrogenation Using a Three Hindered Quadrant Bisphosphine Rhodium Catalyst", Journal of the American Chemical society, (2004), pp. 5966-5967, 126. Cited in ISR. (2 pages).
Imamoto et al., "Searching for Practically Useful P-Chirogenic Phosphine Ligands", The Chemical Record, (2016), pp. 2659-2673, 16. Cited in ISR. (25 pages).
Iwamoto et al., "Computational design of high-performance ligand for enantioselective Markovnikov hydroboration of aliphatic terminal alkenes", Nature Communications, Jun. 12, 2018, pp. 2041-1723, 9 (1), 1-10. Cited in ISR. (10pages).
Iwamoto et al., "Computational design of high-performance ligand for enantioselective Markovnikov hydroboration of aliphatic terminal alkenes", Nature Communications, Jun. 12, 2018, pp. 2041-1723, 9 (1), 1-10. Cited in ISR. with English Translation. (14 pages).
Cai et al., "Copper-Catalyed Enantioseletive Markovnikov Protoboration of x-Olefins Enabled by a Buttressed N-Hetereocylic Carbene Ligand", Angewandte Chemie International Edition, Dec. 12, 2017, pp. 1376-1380, 57. Cited in ISR. (5 pages).

OPTICALLY ACTIVE SUBSTITUTED 2,3-BISPHOSPHINOQUINOXALINES AND PROCESSES FOR PRODUCING THE SAME

CROSS-REFERENCE TO RELATED APPLICATIONS

This is a section 371 application of PCT/JP2018/036440 filed on Sep. 28, 2018, which claims foreign priorities of Japanese patent application No. 2018-119159 filed on Jun. 22, 2018 and Japanese patent application No. 2017-195879 filed on Oct. 6, 2017.

BACKGROUND OF THE INVENTION

Field of the Invention

The present invention relates to an optically active 2,3-bisphosphinopyrazine derivative, a method for producing the same, a transition metal complex, an asymmetric catalyst, and a method for producing an organoboron compound.

Description of Related Art

An optically active phosphine ligand having an asymmetric center on a phosphorus atom plays an important role in a catalytic asymmetric synthesis reaction using a transition metal complex. As the optically active phosphine ligand having an asymmetric center on a phosphorus atom, a 1,2-bis(dialkylphosphino)benzene derivative is proposed in Patent Literature 1.

In Patent Literature 2, a 2,3-bis(dialkylphosphino)pyrazine derivative is proposed. This pyrazine derivative is characterized in that the electron-withdrawing properties are extremely high due to the pyrazine skeleton, and thereby the electron density of the phosphorus atoms at the phosphine sites is low. In addition, in Non Patent Literature 1, a 2,3-bis(dialkylphosphino)pyrazine derivative represented by the following chemical formula (A) is proposed.

[Formula 1]

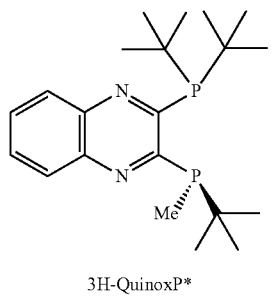

3H-QuinoxP*

CITATION LIST

Patent Literature

Patent Literature 1: Japanese Patent Laid-Open No. 2000-319288
Patent Literature 2: US2007021610 A1

Non Patent Literature

Non Patent Literature 1: Journal of Organic Chemistry Vol. 77, 4184-4188 (2012)

BRIEF SUMMARY OF THE INVENTION

For a catalyst for a catalytic asymmetric synthesis reaction using a transition metal complex, one having better catalytic activity is required. For example, for a hydroboration reaction, generally, the reaction proceeds with anti-Markovnikov type regioselectivity. On the other hand, a hydroboration reaction showing Markovnikov type selectivity is limited to styrene type substrates, and there are few examples of reports on such hydroboration reactions of terminal alkenes substituted by alkyl groups. In addition, even if the 2,3-bis(dialkylphosphino)pyrazine derivative represented by the chemical formula (A) is used as a ligand, the substrate application range, selectivity, and yield are insufficient.

Therefore, it is an object of the present invention to provide a novel optically active 2,3-bisphosphinopyrazine derivative having an asymmetric center on a phosphorus atom useful as a catalyst for use in a catalytic asymmetric synthesis reaction using a transition metal complex, a transition metal complex comprising the same as a ligand, an asymmetric catalyst using the transition metal complex, and a method for producing an organoboron compound by an asymmetric Markovnikov type hydroboration reaction using a terminal alkene substituted by an alkyl group, using the asymmetric catalyst.

DETAILED DESCRIPTION OF THE INVENTION

The present invention provides an optically active 2,3-bisphosphinopyrazine derivative represented by the following general formula (1):

[Formula 2]

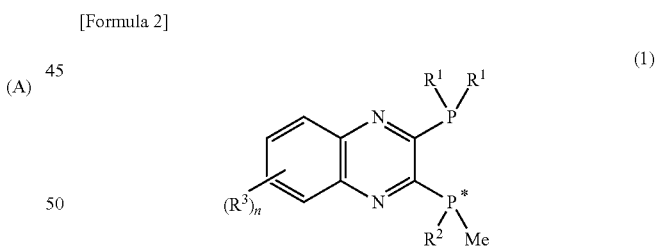

wherein $R^1$ represents a group selected from a branched alkyl group having 3 or more carbon atoms, an adamantyl group, an optionally substituted cycloalkyl group, and an optionally substituted aryl group;

$R^2$ represents a group selected from a branched alkyl group having 3 or more carbon atoms, an adamantyl group, and an optionally substituted cycloalkyl group, provided that when $R^1$ is a tert-butyl group, $R^1$ and $R^2$ are not the same;

$R^3$ represents a monovalent substituent; n represents an integer of 0 to 4; and * represents an asymmetric center on a phosphorus atom.

In addition, the present invention provides a method for producing the optically active 2,3-bisphosphinopyrazine derivative, comprising allowing a deprotonation product of a phosphine-borane represented by the following general formula (3):

[Formula 4]

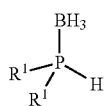
(3)

wherein $R^1$ is as defined in the general formula (1), to act on a 2,3-dihalogenopyrazine derivative represented by the following general formula (2):

[Formula 3]

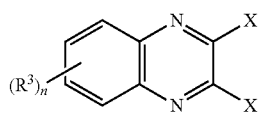
(2)

wherein $R^3$ and n are as defined in the general formula (1); and X represents a halogen atom, to perform an aromatic nucleophilic substitution reaction (1), then performing a deboranation reaction (1) to obtain a phosphinopyrazine derivative represented by the following general formula (4):

[Formula 5]

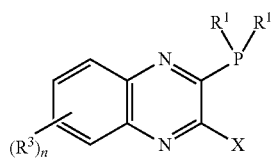
(4)

wherein $R^1$, $R^3$, and n are as defined in the general formula (1), then allowing a deprotonation product of an optically active phosphine-borane represented by the following general formula (5):

[Formula 6]

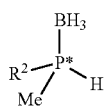
(5)

wherein $R^2$ and * are as defined in the general formula (1), to act on the phosphinopyrazine derivative to perform a nucleophilic substitution reaction (2), and then performing a deboranation reaction (2).

In addition, the present invention provides a method for producing an optically active 2,3-bisphosphinopyrazine derivative represented by the following general formula (1'):

[Formula 7]

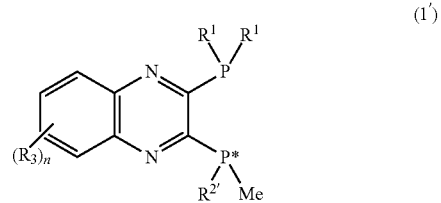
(1')

wherein $R^1$, $R^3$, n, and * are as defined in the general formula (1); and $R^{2'}$ represents a group selected from a branched alkyl group having 3 or more carbon atoms, an adamantyl group, and an optionally substituted cycloalkyl group, comprising allowing a deprotonation product of a phosphine-borane represented by the following general formula (3):

[Formula 9]

(3)

wherein $R^1$ is as defined in the general formula (1), to act on a 2,3-dihalogenopyrazine derivative represented by the following general formula (2):

[Formula 8]

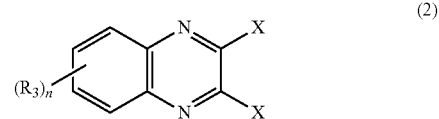
(2)

wherein $R^3$ and n are as defined in the general formula (1); and X represents a halogen atom, to perform an aromatic nucleophilic substitution reaction (1), then performing a deboranation reaction (1) to obtain a phosphinopyrazine derivative represented by the following general formula (4):

[Formula 10]

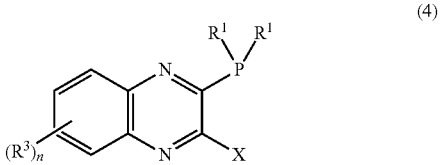
(4)

wherein $R^1$, $R^3$, and n are as defined in the general formula (1), and then mixing a liquid comprising the phosphinopyrazine derivative, an optically active phosphine-borane represented by the following general formula (5'):

[Formula 11]

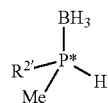

(5')

wherein $R^{2'}$ is as defined in the general formula (1'; and * is as defined in the general formula (1), and a deboranating agent with a base to perform a reaction.

In addition, the present invention provides a transition metal complex comprising the optically active 2,3-bisphosphinopyrazine derivative as a ligand.

In addition, the present invention provides an asymmetric catalyst comprising the transition metal complex.

In addition, the present invention provides a method for producing an organoboron compound, comprising subjecting an alkene compound represented by the following general formula (6):

[Formula 12]

(6)

wherein R represents a hydrogen atom, an alkyl group, a substituted alkyl group, a cycloalkyl group, a substituted cycloalkyl group, an aralkyl group, a substituted aralkyl group, an aryl group, a substituted aryl group, an aliphatic heterocyclic group, a substituted aliphatic heterocyclic group, an aromatic heterocyclic group, a substituted aromatic heterocyclic group, an alkoxy group, a substituted alkoxy group, an aralkyloxy group, a substituted aralkyloxy group, an aryloxy group, a substituted aryloxy group, an alkyloxycarbonyl group, an aralkyloxycarbonyl group, a substituted silyl group or a substituted silyloxy group, an amino group, a substituted amino group, an alkylaminocarboxy group, a substituted alkylaminocarboxy group, an arylaminocarboxy group, an alkyloxycarbonyloxy group, an aryloxycarbonyloxy group, or a halogen atom; and t represents an integer of 0 to 10, to a coupling reaction with a diboron compound represented by the following general formula (7):

[Formula 13]

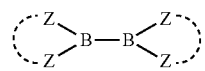

(7)

wherein Z represents the same or a different atom having a lone electron pair, and a dotted line connecting neighboring Z to each other indicates that another atom is bonded to Z; and neighboring Z optionally forms a ring with each other via another atom, in the presence of the asymmetric catalyst, the organoboron compound being represented by the following general formula (8):

[Formula 14]

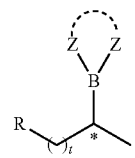

(8)

wherein R and t are as defined in the general formula (6); Z is as defined in the general formula (7); and * indicates an asymmetric carbon atom.

Description of Embodiments

The present invention will be described below based on preferred embodiments.

In the optically active 2,3-bisphosphinopyrazine derivative of the present invention represented by the general formula (1), $R^1$ represents a group selected from a branched alkyl group having 3 or more carbon atoms, an adamantyl group, an optionally substituted cycloalkyl group, and an optionally substituted aryl group. Examples of the branched alkyl group having 3 or more carbon atoms include those having 3 to 8 carbon atoms, such as an iso-propyl group, a tert-butyl group, and a 1,1,3,3-tetramethylbutyl group (which may also be generally referred to as a "tert-octyl group"), and those having 4 to 8 carbon atoms are preferred, and particularly a tert-butyl group and a 1,1,3,3-tetramethylbutyl group are preferred.

Examples of the an optionally substituted cycloalkyl group represented by $R^1$ can include the groups described later as examples of the cycloalkyl group and the substituted cycloalkyl group represented by R in the formula of a general formula (6).

Examples of the optionally substituted aryl group and the aryl group represented by $R^1$ can include the groups described later as examples of the optionally substituted aryl group and the aryl group represented by R in the formula of the general formula (6).

In the general formula (1), $R^2$ represents a group selected from a branched alkyl group having 3 or more carbon atoms, an adamantyl group, and an optionally substituted cycloalkyl group. In terms of the high level of catalytic activity, easy availability, and the like, the branched alkyl group represented by $R^2$ is preferably one having 3 to 8 carbon atoms and particularly preferably one having 4 to 8 carbon atoms. In addition, the branched alkyl group represented by $R^2$ is preferably a tertiary alkyl group.

When $R^1$ is a tert-butyl group, $R^1$ and $R^2$ are not the same. In detail, when $R^1$ is a tert-butyl group, the branched alkyl group having 3 or more carbon atoms represented by $R^2$ is one other than a tert-butyl group and particularly preferably a branched tertiary alkyl group having 5 to 8 carbon atoms. When $R^1$ is a tert-butyl group, examples of a particularly preferred branched alkyl group having 3 or more carbon atoms represented by $R^2$ include an amyl group and a 1,1,3,3-tetramethylbutyl group.

When $R^1$ is a branched alkyl group having 3 or more carbon atoms other than a tert-butyl group, an adamantyl group, an optionally substituted cycloalkyl group, or an optionally substituted aryl group, examples of a particularly preferred branched alkyl group having 3 or more carbon atoms represented by $R^2$ include a tert-butyl group, an amyl group, and a 1,1,3,3-tetramethylbutyl group.

Examples of the optionally substituted cycloalkyl group represented by $R^2$ can include the groups described later as examples of the cycloalkyl group and the substituted cycloalkyl group represented by R in the formula of the general formula (6).

In the present invention, $R^1$ is preferably a group selected from a tert-butyl group, an adamantyl group, a 1,1,3,3-tetramethylbutyl group, and an optionally substituted aryl group, and particularly preferred combinations with $R^2$ will be shown below.

When $R^1$ is a tert-butyl group in the general formula (1), particularly $R^2$ is preferably a 1,1,3,3-tetramethylbutyl group or an adamantyl group from the viewpoint of being able to effectively shield the space of a reaction field.

When $R^1$ is an adamantyl group, a 1,1,3,3-tetramethylbutyl group, or an optionally substituted aryl group, in the general formula (1), similarly, the space of a reaction field can be effectively shielded. From this viewpoint, when $R^1$ is an adamantyl group, a 1,1,3,3-tetramethylbutyl group, or an optionally substituted aryl group, particularly $R^2$ is preferably a tert-butyl group, a 1,1,3,3-tetramethylbutyl group, or an adamantyl group. When $R^1$ is a group other than a tert-butyl group, especially when $R^1$ is an adamantyl group or a 1,1,3,3-tetramethylbutyl group, $R^2$ is preferably a tert-butyl group, a 1,1,3,3-tetramethylbutyl group, or an adamantyl group. Particularly when $R^1$ is an adamantyl group, $R^2$ is particularly preferably a tert-butyl group, a 1,1,3,3-tetramethylbutyl group, or an adamantyl group.

In the general formula (1), $R^3$ represents a monovalent substituent. $R^3$ is not particularly limited as long as it is a monovalent substituent. Examples of $R^3$ include an alkyl group linear or branched and having 1 to 5 carbon atoms, a nitro group, an amino group, a hydroxyl group, an alkoxy group, a fluoro group, a chloro group, a bromo group, and an iodo group.

n in the general formula (1) represents an integer of 0 to 4, and * represents an asymmetric center on a phosphorus atom.

In the optically active 2,3-bisphosphinopyrazine derivative represented by the general formula (1), the electron density of the P atoms at the phosphine sites is lowered due to the electron-withdrawing properties due to the pyrazine skeleton. As a result, the phosphine sites are inert to oxidation by air, and the storage stability is high. On the other hand, the electron density decreasing properties at the phosphine sites do not impair catalytic activity.

Examples of specific compounds of the optically active 2,3-bisphosphinopyrazine derivative represented by the general formula (1) include 2-[(1S)-(1-adamantyl)(methyl)phosphanyl]-3-(di-tert-butylphosphanyl)quinoxaline, (S)-2-(di-tert-butylphosphanyl)-3-[methyl(2,4,4-trimethylpentan-2-yl)phosphanyl]quinoxaline, 2-[(diadamantan-1-yl)phosphanyl]-3-[(R)-tert-butyl(methyl)phosphanyl]quinoxaline, (S)-2-(adamantan-1-yl(methyl)phosphanyl)-3-[(diadamantan-1-yl)phosphanyl]quinoxaline, and 2-[(diadamantan-1-yl)phosphanyl]-3-[(S)-methyl(2,4,4-trimethylpentan-2-yl)phosphanyl]quinoxaline).

Next, a preferred method for producing an optically active 2,3-bisphosphinopyrazine derivative according to the present invention will be described.

A first preferred method for producing the optically active 2,3-bisphosphinopyrazine derivative represented by the general formula (1) according to the present invention comprises deprotonating the phosphine-borane represented by the general formula (3), allowing the deprotonation product produced thereby to act on the 2,3-dihalogenopyrazine derivative represented by the general formula (2) to perform a nucleophilic substitution reaction (1), then performing a deboranation reaction (1) to obtain the phosphinopyrazine derivative represented by the general formula (4), then allowing a deprotonation product of the optically active phosphine-borane represented by the general formula (5) to act on the phosphinopyrazine derivative represented by the general formula (4) to perform a nucleophilic substitution reaction (2), and then performing a deboranation reaction (2).

In other words, the method for producing the optically active 2,3-bisphosphinopyrazine derivative represented by the general formula (1) according to the present invention has the following four steps:

(1) a first step of performing the nucleophilic substitution reaction (1)

(2) a second step of performing the deboranation reaction (1)

(3) a third step of performing the nucleophilic substitution reaction (2)

(4) a fourth step of performing the deboranation reaction (2).

The first step is the step of deprotonating the phosphine-borane represented by the general formula (3) and allowing the obtained deprotonation product to act on the 2,3-dihalogenopyrazine derivative represented by the general formula (2) to perform the nucleophilic substitution reaction (1) to obtain a phosphinopyrazine-borane derivative represented by the following general formula (9):

[Formula 15]

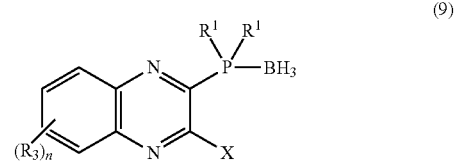

(9)

wherein $R^1$, $R^3$, X, and n are as defined in the general formula (1).

In the reaction in the first step, a liquid comprising the 2,3-dihalogenopyrazine derivative represented by the general formula (2) (hereinafter referred to as an "A liquid") is prepared, and apart from the A liquid, a liquid in which the phosphine-borane represented by the general formula (3) is deprotonated (hereinafter referred to as a "B liquid") is prepared.

The 2,3-dihalogenopyrazine derivative according to the A liquid is represented by the following general formula (2):

[Formula 16]

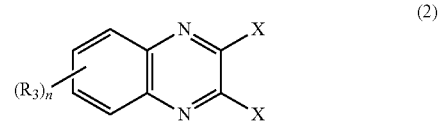

(2)

wherein $R^3$ and n are as defined in the general formula (1); and X represents a halogen atom.

X in the formula of the general formula (2) is a halogen atom, and examples of the halogen atom include a chlorine atom, a bromine atom, and an iodine atom. Among these, as X, a chlorine atom is preferred. $R^3$ and n in the formula of the general formula (2) correspond to $R^3$ and n in the formula of the optically active 2,3-bisphosphinopyrazine derivative of the general formula (1), and $R^3$ represents a monovalent substituent, and n represents an integer of 0 to 4.

The 2,3-dihalogenopyrazine derivative represented by the general formula (2) may be a commercial product. For example, a 2,3-dihalogenopyrazine and the like are available from TOKYO CHEMICAL INDUSTRY CO., LTD.

The A liquid may be a solution or a slurry. As the solvent that can be used in the A liquid, for example, a solvent that can dissolve the 2,3-dihalogenopyrazine derivative represented by the general formula (2) and is inert to the 2,3-dihalogenopyrazine represented by the general formula (2) is preferably used. Examples of the solvent include tetrahydrofuran, N,N-dimethylformamide, diethyl ether, cyclopentyl methyl ether, tert-butyl methyl ether, dioxane, hexane, and toluene. These solvents can be used as a single or mixed solvent. In addition, it is not always necessary to completely dissolve the 2,3-dihalogenopyrazine represented by the general formula (2), and the reaction can be initiated even from a slurry state.

It is preferred from the viewpoint of reactivity and productivity that the concentration of the 2,3-dihalogenopyrazine derivative represented by the general formula (2) in the A liquid be 0.1 to 80% by mass, particularly 1 to 30% by mass.

The B liquid is a solution comprising a phosphineborane compound obtained by deprotonating a phosphine-borane.

The phosphine-borane according to the B liquid is represented by the following general formula (3):

[Formula 17]

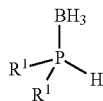

(3)

wherein $R^1$ is as defined in the general formula (1).

$R^1$ in the formula of the general formula (3) corresponds to $R^1$ in the formula of the optically active 2,3-bisphosphinopyrazine derivative of the general formula (1). In other words, $R^1$ in the formula (3) represents a group selected from a branched alkyl group having 3 or more carbon atoms, an adamantyl group, an optionally substituted cycloalkyl group, and an optionally substituted aryl group, and specific examples thereof and preferred groups are as described above for $R^1$ in the formula.

The phosphine-borane represented by the general formula (3) can be produced by a known method. Examples of the method for producing the phosphine-borane represented by the general formula (3) include Japanese Patent Laid-Open No. 2001-253889, Japanese Patent Laid-Open No. 2003-300988, Japanese Patent Laid-Open No. 2007-70310, Japanese Patent Laid-Open No. 2010-138136, and J. Org. Chem, 2000, vol. 65, P4185-4188.

In the preparation of the B liquid, for example, the phosphine-borane represented by the general formula (3) is dissolved in a solvent, and then a base is added. Thus, the deprotonation of the phosphine-borane represented by the general formula (3) can be performed.

For the solvent that dissolves the phosphine-borane represented by the general formula (3), a solvent inert to the phosphine-borane represented by the general formula (3) and the phosphine compound produced from the phosphine-borane by deprotonation can be used without particular limitation. Examples of the solvent include tetrahydrofuran, N,N-dimethylformamide, diethyl ether, tert-butyl methyl ether, cyclopentyl methyl ether, dioxane, hexane, and toluene. These solvents can be used as a single or mixed solvent.

It is preferred from the viewpoint of reactivity and productivity that in the preparation of the B liquid, the concentration of the phosphine-borane represented by the general formula (3) in the solvent be 1 to 80% by mass, particularly 5 to 30% by mass.

Examples of the base used in the deprotonation of the B liquid include n-butyllithium (n-BuLi), sec-butyllithium lithium, diisopropylamide, methylmagnesium bromide, t-butoxypotassium, Hunig's base, potassium hydroxide, and sodium hydroxide, and the base is preferably n-butyllithium.

It is preferred from the viewpoint of economy and reactivity that the amount of the base added be in the range of 1.0 to 1.5, particularly 1.0 to 1.2, in the molar ratio of the base to the phosphine-borane represented by the general formula (3).

It is preferred from the viewpoint of reactivity and the prevention of side reactions that the temperature at which the base is added be −20 to 20° C., particularly −20 to 0° C.

By adding the base to the liquid comprising the phosphine-borane represented by the general formula (3), the deprotonation of the phosphine-borane represented by the general formula (3) is rapidly performed. An aging reaction can be continuously performed as needed, after the completion of the addition of the base in order to complete the deprotonation reaction.

In the reaction in the first step, it is possible to add the A liquid to the B liquid or add the B liquid to the A liquid to perform the nucleophilic substitution reaction (1) to obtain the phosphinopyrazine-borane derivative represented by the general formula (9).

It is preferred from the viewpoint of reactivity and economy that for the addition of the A liquid or the B liquid, the A liquid or the B liquid be added so that the molar ratio of the phosphine compound obtained by deprotonation from the phosphine-borane represented by the general formula (3) to the 2,3-dihalogenopyrazine derivative represented by the general formula (2) in the A liquid is in the range of 1.0 to 2.0, particularly 1.0 to 1.5.

The rate at which the A liquid or the B liquid is added is preferably a constant rate from the viewpoint of obtaining a product having stable quality.

It is preferred from the viewpoint of reactivity and the prevention of side reactions that the temperature at which the A liquid or the B liquid is added be −20 to 50° C., particularly −20 to 5° C.

After the addition of the A liquid or the B liquid, an aging reaction can be continuously performed as needed, in order to complete the nucleophilic substitution reaction (1). It is preferred from the viewpoint of the reaction rate and the purity of the obtained target that the reaction temperature when this aging reaction is performed be −20 to 80° C., particularly 0 to 50° C.

After the completion of the nucleophilic substitution reaction (1), purification by an ordinary method such as liquid separation and washing, extraction, distillation, or solvent removal is performed as needed, to obtain the phosphinopyrazine-borane derivative represented by the general formula (9).

The second step is the step of subjecting the phosphinopyrazine-borane derivative represented by the general formula (9) obtained in the first step to the deboranation reaction (1) with a deboranating agent in a solvent to obtain a phosphinopyrazine derivative represented by the following general formula (4):

[Formula 18]

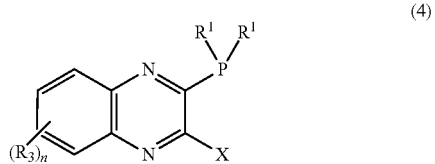

(4)

wherein $R^1$, $R^3$, and n are as defined in the general formula (1); and X is as defined in the general formula (2).

Examples of the boranating agent that can be used in the second step include N,N,N',N'-tetramethylethylenediamine (TMEDA), triethylenediamine (DABCO), triethylamine, $HBF_4$, and trifluoromethanesulfonic acid, and the boranating agent is preferably TMEDA. The amount of the deboranating agent added is usually 2 to 20 equivalents, preferably 3 to 10 equivalents, based on the phosphinopyrazine-borane derivative represented by the general formula (9).

As the solvent that can be used in the second step, a solvent that can dissolve the phosphinopyrazine-borane derivative represented by the general formula (9) and is inert to the phosphinopyrazine-borane derivative and the phosphinopyrazine derivative represented by the general formula (4) produced can be used without particular limitation. Examples of the solvent include ethyl acetate, tetrahydrofuran, N,N-dimethylformamide, diethyl ether, tert-butyl methyl ether, cyclopentyl methyl ether, dioxane, hexane, and toluene, and these solvents can be used as a single or mixed solvent.

It is preferred from the viewpoint of the reaction rate and the purity of the obtained target that the reaction temperature of the deboranation reaction (1) be preferably −20 to 80° C., more preferably −20 to 50° C. The reaction time of the deboranation reaction (1) is preferably 30 min or more, more preferably 1 to 5 h.

After the completion of the deboranation reaction (1), purification by an ordinary method such as liquid separation and washing, extraction, column chromatography, distillation, or solvent removal is performed as needed, to obtain the phosphinopyrazine derivative represented by the general formula (4).

The third step is the step of allowing a deprotonation product of the optically active phosphine-borane represented by the general formula (5) to act on the phosphinopyrazine derivative represented by the general formula (4) obtained in the second step to perform the nucleophilic substitution reaction (2) to obtain an optically active phosphinopyrazine-borane derivative represented by the following general formula (10):

[Formula 19]

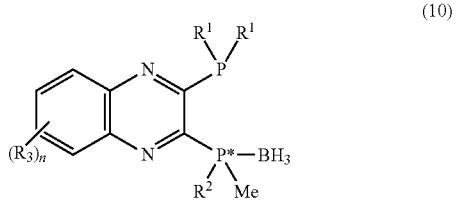

(10)

wherein $R^1$, $R^2$, $R^3$, n, and * are as defined in the general formula (1).

In the reaction in the third step, a liquid comprising the phosphinopyrazine derivative represented by the general formula (4) (hereinafter referred to as a "C liquid") is prepared, and apart from the C liquid, a liquid in which the optically active phosphine-borane represented by the general formula (5) is deprotonated (hereinafter referred to as a "D liquid") is prepared.

The C liquid may be a solution or a slurry. As the solvent that can be used in the C liquid, for example, a solvent that can dissolve the phosphinopyrazine derivative represented by the general formula (4) and is inert to the phosphinopyrazine derivative represented by the general formula (4) is preferably used. Examples of the solvent include tetrahydrofuran, 1,2-dimethoxyethane, N,N-dimethylformamide, diethyl ether, tert-butyl methyl ether, cyclopentyl methyl ether, dioxane, hexane, and toluene. These solvents can be used as a single or mixed solvent. In addition, it is not always necessary to completely dissolve the phosphinopyrazine derivative represented by the general formula (4), and the reaction can be initiated even from a slurry state.

It is preferred from the viewpoint of productivity and the control of side reactions that the concentration of the phosphinopyrazine derivative represented by the general formula (4) in the C liquid be 0.1 to 80% by mass, particularly 1 to 50% by mass.

The D liquid is a solution comprising an optically active phosphineborane compound obtained by deprotonating the optically active phosphine-borane represented by the general formula (5).

The optically active phosphine-borane according to the D liquid is represented by the following general formula (5):

[Formula 20]

(5)

wherein $R^2$ and * are as defined above.

$R^2$ in the formula of the general formula (5) corresponds to $R^2$ in the formula of the optically active 2,3-bisphosphinopyrazine derivative of the general formula (1). In other words, $R^2$ in the formula (5) represents a group selected from a branched alkyl group having 3 or more carbon atoms, an adamantyl group, and an optionally substituted cycloalkyl group, on the condition that when $R^1$ in the formula (4) is a tert-butyl group, $R^2$ in the formula (5) is a group other than a tert-butyl group. Examples of $R^2$ in the formula (5) and preferred $R^2$ in the formula (5) include those described above for $R^2$ in the formula (1). For example, as the branched alkyl group having 3 or more carbon atoms represented by $R^2$ in the formula (5), branched tertiary alkyl groups having 4 to 8 carbon atoms are preferred. When $R^1$ in the formula (4) is a group other than a tert-butyl group, examples of the branched alkyl group having 3 or more carbon atoms represented by $R^2$ in the formula (5) include a tert-butyl group, an amyl group, and a 1,1,3,3-tetramethylbutyl group. When $R^1$ in the formula (4) is a tert-butyl group, examples of the branched alkyl group having 3 or more carbon atoms represented by $R^2$ in the formula (5) include an amyl group and a 1,1,3,3-tetramethylbutyl group.

The optically active phosphine-borane represented by the general formula (5) can be produced by a known method. Examples of the method for producing the phosphine-borane represented by the general formula (5) include Japanese Patent Laid-Open No. 2001-253889, Japanese Patent Laid-Open No. 2003-300988, Japanese Patent Laid-Open No. 2007-70310, Japanese Patent Laid-Open No. 2010-138136, and J. Org. Chem, 2000, vol. 65, P4185-4188.

In the preparation of the D liquid, for example, the optically active phosphine-borane represented by the general formula (5) is dissolved in a solvent, and then a base is added. Thus, the deprotonation of the optically active phosphine-borane represented by the general formula (5) can be performed.

For the solvent that dissolves the optically active phosphine-borane represented by the general formula (5), a solvent inert to the optically active phosphine-borane represented by the general formula (5) and the optically active phosphine compound produced from the optically active phosphine-borane by deprotonation can be used without particular limitation. Examples of the solvent include tetrahydrofuran, 1,2-dimethoxyethane, N,N-dimethylformamide, diethyl ether, tert-butyl methyl ether, cyclopentyl methyl ether, dioxane, hexane, and toluene. These solvents can be used as a single or mixed solvent.

It is preferred from the viewpoint of reactivity and productivity that in the preparation of the D liquid, the concentration of the optically active phosphine-borane represented by the general formula (5) in the solvent be 1 to 80% by mass, particularly 5 to 30% by mass.

Examples of the base used in the deprotonation of the D liquid include n-butyllithium, sec-butyllithium lithium, lithium diisopropylamide, methylmagnesium bromide, t-butoxypotassium, Hunig's base, potassium hydroxide, and sodium hydroxide, and the base is preferably n-butyllithium.

It is preferred from the viewpoint of economy and reactivity that the amount of the base added be in the range of 1.0 to 2.0, particularly 1.0 to 1.5, in the molar ratio of the base to the optically active phosphine-borane represented by the general formula (5).

It is preferred that the temperature at which the base is added be −20 to 20° C., particularly −20 to 0° C., from the viewpoint of being able to deprotonate the optically active phosphine-borane represented by the general formula (5) while maintaining its optical purity.

By adding the base to the liquid comprising the optically active phosphine-borane represented by the general formula (5), the deprotonation of the optically active phosphine-borane represented by the general formula (5) is rapidly performed. An aging reaction can be continuously performed as needed, after the completion of the addition of the base in order to complete the deprotonation reaction.

In the reaction in the third step, it is possible to add the C liquid to the D liquid or add the D liquid to the C liquid to perform the nucleophilic substitution reaction (2) to obtain the optically active phosphinopyrazine-borane derivative represented by the general formula (10).

It is preferred from the viewpoint of reactivity and economy that for the addition of the C liquid or the D liquid, the C liquid or the D liquid be added so that the molar ratio of the optically active phosphine compound obtained by deprotonation from the optically active phosphine-borane represented by the general formula (5) to the phosphinopyrazine derivative represented by the general formula (4) in the C liquid is in the range of 1.0 to 2.0, particularly 1.0 to 1.5.

For the rate at which the C liquid or the D liquid is added, the C liquid or the D liquid is preferably added at a constant rate from the viewpoint of obtaining a product having stable quality.

It is preferred that the temperature at which the C liquid or the D liquid is added be −20 to 50° C., particularly −20 to 0° C., from the viewpoint of obtaining a product having high optical purity in high yield.

After the addition of the C liquid or the D liquid, an aging reaction can be continuously performed as needed, in order to complete the nucleophilic substitution reaction (2). It is preferred that the reaction temperature when this aging reaction is performed be −20 to 50° C., particularly −20 to 30° C., from the viewpoint of obtaining a product having high optical purity in high yield.

After the completion of the nucleophilic substitution reaction (2), purification by an ordinary method such as liquid separation and washing, extraction, distillation, or solvent removal is performed as needed, to obtain the optically active phosphinopyrazine-borane derivative represented by the general formula (10).

The fourth step is the step of subjecting the optically active phosphinopyrazine-borane derivative represented by the general formula (10) obtained in the third step to the deboranation reaction (2) with a deboranating agent in a solvent to obtain the target optically active 2,3-bisphosphinopyrazine derivative represented by the following general formula (1):

[Formula 21]

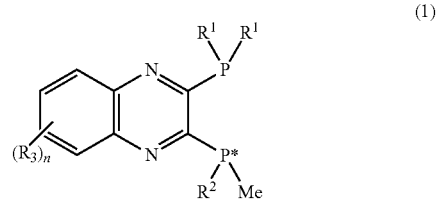

(1)

wherein $R^1$, $R^2$, $R^3$, n, and * are as defined above.

Examples of the boranating agent that can be used in the fourth step include N,N,N',N'-tetramethylethylenediamine (TMEDA), triethylenediamine (DABCO), triethylamine, $HBF_4$, and trifluoromethanesulfonic acid, and the boranating agent is preferably TMEDA. The amount of the deboranating agent added is usually 2 to 20 equivalents, preferably 3 to 10 equivalents, based on the optically active phosphinopyrazine-borane derivative represented by the general formula (10).

As the solvent that can be used in the fourth step, a solvent that can dissolve the phosphinopyrazine-borane derivative represented by the general formula (10) and is inert to the phosphinopyrazine-borane derivative and the optically active 2,3-bisphosphinopyrazine derivative represented by the general formula (1) produced can be used without particular limitation. Examples of the solvent include ethyl acetate, tetrahydrofuran, 1,2-dimethoxyethane, N,N-dimethylformamide, diethyl ether, tert-butyl methyl ether, cyclopentyl methyl ether, dioxane, hexane, and toluene, and these solvents can be used as a single or mixed solvent.

It is preferred that the reaction temperature of the deboranation reaction (2) be preferably −20 to 80° C., more preferably −20 to 50° C., from the viewpoint of obtaining the 2,3-bisphosphinopyrazine derivative represented by the general formula (1) having high optical purity. It is preferred that the reaction time of the deboranation reaction (2) be 30 min or more, particularly 1 to 10 h.

After the completion of the deboranation reaction (2), purification by an ordinary method, liquid separation and washing, extraction, crystallization, distillation, sublimation, or column chromatography, is performed as needed, to obtain the target optically active 2,3-bisphosphinopyrazine derivative represented by the general formula (1).

For the method for producing the optically active 2,3-bisphosphinopyrazine derivative represented by the general formula (1) according to the present invention, the optically active 2,3-bisphosphinopyrazine derivative can also be produced by a method of performing the above-described first step and second step and then performing the following Ath step (hereinafter also referred to as a "second production method").

The Ath step is the step of adding a base to a liquid comprising the phosphinopyrazine derivative represented by the general formula (4) obtained in the second step, the optically active phosphine-borane represented by the general formula (5), and a deboranating agent (hereinafter referred to as a "Y liquid") to obtain the optically active 2,3-bisphosphinopyrazine derivative represented by the general formula (1) at once.

The second production method allows both $R^1$ and $R^2$ to be t-butyl. In the following, the general formula (1) when both $R^1$ and $R^2$ are allowed to be t-butyl will be described as a general formula (1'), and the general formula (5) will be described as a general formula (5'). The general formula (1) and the general formula (1') are the same except that the former does not include the case where both $R^1$ and $R^2$ are t-butyl, and the latter includes the case. The same applies to the relationship between the general formula (5) and the general formula (5').

The content of the phosphinopyrazine derivative represented by the general formula (4) in the Y liquid is 1 to 50% by mass, preferably 5 to 20% by mass, based on the total amount of the Y liquid.

For the optically active phosphine-borane represented by the general formula (5'), one the same as the optically active phosphine-borane represented by the general formula (5) used in the third step except that the case where both $R^1$ and $R^2$ are t-butyl as described above is allowed as described above can be used. It is preferred from the viewpoint of reactivity and economy that the optically active phosphine-borane represented by the general formula (5') be added so that the amount of the optically active phosphine-borane represented by the general formula (5') added is in the range of 1.0 to 2.0, particularly 1.0 to 1.5, in the molar ratio to the phosphinopyrazine derivative represented by the general formula (4).

For the deboranating agent used in the Ath step, the same one as in the above-described third step can be used. The amount of the deboranating agent added is usually preferably 2 to 20 equivalents, more preferably 3 to 10 equivalents, based on the phosphinopyrazine derivative represented by the general formula (4).

The Y liquid is a liquid in which the phosphinopyrazine derivative represented by the general formula (4), the optically active phosphine-borane represented by the general formula (5'), and a deboranating agent are dissolved or dispersed in a solvent.

The solvent used in the Y liquid is not particularly limited as long as it is a solvent that can dissolve or disperse the phosphinopyrazine derivative represented by the general formula (4) and is inert to the phosphinopyrazine derivative represented by the general formula (4). Examples of the solvent that can be used for the preparation of the Y liquid include tetrahydrofuran, 1,2-dimethoxyethane, N,N-dimethylformamide, diethyl ether, tert-butyl methyl ether, cyclopentyl methyl ether, dioxane, hexane, and toluene. These solvents can be used as a single or mixed solvent.

Examples of the base according to the Ath step include n-butyllithium, lithium diisopropylamide, methylmagnesium bromide, potassium-tert-butoxide, sodium-tert-butoxide, Hunig's base, potassium hydroxide, and sodium hydroxide. Among these, as the base according to the Ath step, potassium-tert-butoxide is preferred in that a product having an excellent reaction yield and excellent quality is obtained.

In the Ath step, the Y liquid and the base are mixed to perform a reaction to obtain an optically active 2,3-bisphosphinopyrazine derivative represented by the general formula (1'). As the method for mixing the Y liquid and the base, adding the base to the Y liquid is preferred. When the base is added to the Y liquid, a solution in which the base is dissolved in a solvent (hereinafter referred to as a "Z liquid") may be added to the Y liquid, or the base may be added to the Y liquid as a solid, in the Ath step. In the Ath step, adding the Z liquid to the Y liquid is preferred in that the reaction is easily controlled, and a product having stable quality is easily obtained.

The content of the base in the Z liquid is not particularly limited, but it is preferred in terms of high reactivity and productivity that the content is 1 to 50% by mass, preferably 5 to 30% by mass, based on the total amount of the Z liquid.

The solvent used in the Z liquid is not particularly limited as long as it is a solvent that can dissolve the base and is inert. Examples of the solvent according to the Z liquid include tetrahydrofuran, 1,2-dimethoxyethane, N,N-dimethylformamide, diethyl ether, tert-butyl methyl ether, cyclopentyl methyl ether, dioxane, hexane, and toluene. These solvents are used as a single or mixed solvent.

It is preferred in terms of high economy and high reactivity that in the Ath step, the amount of the base added to the Y liquid is 1.0 to 1.5 mol, preferably 1.0 to 1.2 mol, based on 1 mol of the optically active phosphine-borane represented by the general formula (5') in the Y liquid.

In the Ath step, when a solid or liquid base is added to the Y liquid as the Z liquid, or when a liquid base is added to the Y liquid, the rate at which the base is added to the Y liquid is not particularly limited as long as the reaction heat can be controlled in a range in which no side reactions occur. But, the rate at which the base is added to the Y liquid is preferably a constant rate in that a product having stable quality is obtained. When a solid base is directly added to the Y liquid, the solid base is desirably added in portions while the state of the reaction heat is observed.

In the Ath step, the temperature of the Y liquid (the temperature of the reaction liquid) when the base is added to the Y liquid is preferably −25 to 50° C. in that it is industrially advantageous, and particularly preferably −25 to 20° C. in that a product having high optical purity is obtained in high yield.

In the Ath step, after the base is added to the Y liquid, aging can be performed as needed, in order to complete the reaction. The aging temperature when aging is performed is preferably −25 to 80° C. in that it is industrially advantageous, and particularly preferably −25 to 30° C. in that a product having high optical purity is obtained in high yield.

After completion, purification by an ordinary method, liquid separation and washing, extraction, crystallization, distillation, sublimation, or column chromatography, is performed as needed, to obtain the target optically active 2,3-bisphosphinopyrazine derivative represented by the general formula (1').

The optically active 2,3-bisphosphinopyrazine derivative represented by the general formula (1) according to the present invention, as a ligand, can form a complex with a transition metal. This transition metal complex is useful as an asymmetric synthesis catalyst. Examples of asymmetric synthesis include the hydroboration reactions of olefins, Enantioselective Substitution of Allylic Carbonates with Diboron, the synthesis of optically active piperidine and tetrahydroquinoline derivative compounds by Dearomatization/Borylation of Pyridines, enantioselective borylation reactions to allyl acetal derivatives and allyl ketal derivatives, the asymmetric hydrogenation reactions of dehydroamino acids, and asymmetric coupling reactions, asymmetric hydrosilylation reactions, and asymmetric Michael reactions involving C—C bonds and C—N bonds.

Examples of the transition metal that can form a complex include rhodium, ruthenium, iridium, palladium, nickel, iron, and copper, and the transition metal is preferably a rhodium metal, a palladium metal, or a copper metal.

The method for producing the optically active 2,3-bisphosphinopyrazine derivative represented by the general formula (1) is as described above, but in the production method having the above-described first step to fourth step, instead of previously allowing the phosphine-borane represented by the formula (3) deprotonated, to act on the 2,3-dihalogenopyrazine derivative represented by the general formula (2), the optically active phosphine-borane represented by the formula (5) deprotonated may be previously allowed to act to perform an aromatic nucleophilic substitution reaction and a deboranation reaction. In this case, the phosphine-borane represented by the formula (3) deprotonated is allowed to act on the obtained phosphinopyrazine derivative to perform an aromatic nucleophilic substitution reaction and a deboranation reaction to obtain the optically active 2,3-bisphosphinopyrazine derivative represented by the formula (1).

However, it is preferred that the phosphine-borane represented by the formula (3) deprotonated be previously allowed to act, as described above, because the optically active 2,3-bisphosphinopyrazine derivative represented by the formula (1) can be obtained with the optical purity increased.

Also when the production method has the above-described first step, second step, and Ath step, similarly, a method in which instead of previously allowing the phosphine-borane represented by the formula (3) deprotonated, to act on the 2,3-dihalogenopyrazine derivative represented by the general formula (2), the optically active phosphine-borane represented by the formula (5') deprotonated is previously allowed to act is also considered. But, it is preferred that the phosphine-borane represented by the formula (3) deprotonated be previously allowed to act, and then the optically active phosphine-borane represented by the formula (5') be allowed to act, because the optically active 2,3-bisphosphinopyrazine derivative represented by the formula (1') can be obtained with the optical purity increased.

The method for forming a complex with a rhodium metal using the optically active 2,3-bisphosphinopyrazine derivative represented by the general formula (1) as a ligand should follow, for example, a method described in Jikken Kagaku Koza (Experimental Chemistry Course) 4th ed. (edited by the Chemical Society of Japan, published by Maruzen Publishing Co., Ltd., vol. 18, pp. 327-353), and, for example, a rhodium complex can be produced by reacting the optically active 2,3-bisphosphinopyrazine derivative represented by the general formula (1) with bis(cyclooctane-1,5-diene)rhodium hexafluoroantimonate, bis(cyclooctane-1,5-diene)rhodium tetrafluoroborate, or the like.

As the method for forming a complex with a palladium metal using the optically active 2,3-bisphosphinopyrazine derivative represented by the general formula (1) as a ligand, a palladium complex can be produced, for example, by reacting the optically active 2,3-bisphosphinopyrazine derivative represented by the general formula (1) with n-allylpalladium chloride, for example, according to a method described in "Y. Uozumi and T. Hayashi, J. Am. Chem. Soc., 1991, 113, 9887."

As the method for forming a complex with a copper metal using the optically active 2,3-bisphosphinopyrazine derivative represented by the general formula (1) as a ligand, for example, a complex can be easily produced by mixing the optically active 2,3-bisphosphinopyrazine derivative represented by the general formula (1) and Cu(OtBu) in a solvent. A complex can also be produced by mixing a copper(I) salt and KOtBu in a solvent in the coexistence of a 2,3-bisphosphinopyrazine derivative. Examples of the copper(I) salt include CuF, CuCl, CuBr, CuI, $CuPF_6$, $CuBPh_4$, $CuBF_4$, CuOAc, and $CuBF_4(MeCN)_4$. A monovalent Cu ion and the derivative represented by the general formula (1) usually form a complex in a molar ratio of 1:1.

The copper metal complex obtained by forming the complex with a copper metal using the optically active 2,3-bisphosphinopyrazine derivative represented by the general formula (1) as a ligand (hereinafter sometimes simply referred to as a "copper metal complex") is useful particularly as an asymmetric catalyst for various borylation reactions such as a hydroboration reaction.

In a method for producing an organoboron compound according to the present invention, an organoboron compound is produced by the Markovnikov selective hydroboration reaction of a terminal alkene using the copper metal complex of the present invention as an asymmetric catalyst.

In other words, in the method for producing an organoboron compound according to the present invention, the alkene compound represented by the general formula (6) is subjected to a coupling reaction, using the copper metal complex of the present invention as an asymmetric catalyst (hereinafter sometimes simply referred to as an "asymmetric catalyst"), with the diboron compound represented by the general formula (7) in the presence of the asymmetric catalyst to produce the organoboron compound represented by the general formula (8).

The alkene compound that is a starting raw material in the method for producing an organoboron compound according to the present invention is represented by the following general formula (6):

[Formula 22]

(6)

wherein R represents a hydrogen atom, an alkyl group, a substituted alkyl group, a cycloalkyl group, a substituted cycloalkyl group, an aralkyl group, a substituted aralkyl group, an aryl group, a substituted aryl group, an aliphatic heterocyclic group, a substituted aliphatic heterocyclic group, an aromatic heterocyclic group, a substituted aromatic heterocyclic group, an alkoxy group, a substituted alkoxy group, an aralkyloxy group, a substituted aralkyloxy group, an aryloxy group, a substituted aryloxy group, an alkyloxycarbonyl group, an aralkyloxycarbonyl group, a substituted silyl group or a substituted silyloxy group, an amino group, a substituted amino group, an alkylaminocarboxy group, a substituted alkylaminocarboxy group, an arylaminocarboxy group, an alkyloxycarbonyloxy group, an aryloxycarbonyloxy group, or a halogen atom; and t represents an integer of 0 to 10.

The alkyl group represented by R in the formula of the general formula (6) may be linear or branched. Examples of the alkyl group include alkyl groups having 1 to 6 carbon atoms. Specific examples include a methyl group, an ethyl group, a n-propyl group, a 2-propyl group, a n-butyl group, a 2-butyl group, an isobutyl group, a tert-butyl group, a n-pentyl group, a 2-pentyl group, a tert-pentyl group, a 2-methylbutyl group, a 3-methylbutyl group, a 2,2-dimethylpropyl group, a n-hexyl group, a 2-hexyl group, a 3-hexyl group, a tert-hexyl group, a 2-methylpentyl group, a 3-methylpentyl group, a 4-methylpentyl group, and a 5-methylpentyl group.

Examples of the cycloalkyl group represented by R in the formula of the general formula (6) include cycloalkyl groups having 3 to 7 carbon atoms. Specific examples include a cyclopropyl group, a cyclobutyl group, a cyclopentyl group, a cyclohexyl group, a cycloheptyl group, a 2-methylcyclopentyl group, a 3-methylcyclopentyl group, a cycloheptyl group, a 2-methylcyclohexyl group, a 3-methylcyclohexyl group, and a 4-methylcyclohexyl group.

Examples of the aralkyl group represented by R in the formula of the general formula (6) include aralkyl groups having 7 to 12 carbon atoms. Specific examples include a benzyl group, a 2-phenylethyl group, a 1-phenylpropyl group, a 2-phenylpropyl group, a 3-phenylpropyl group, a 1-phenylbutyl group, a 2-phenylbutyl group, a 3-phenylbutyl group, a 4-phenylbutyl group, a 1-phenylpentyl group, a 2-phenylpentyl group, a 3-phenylpentyl group, a 4-phenylpentyl group, a 5-phenylpentyl group, a 1-phenylhexyl group, a 2-phenylhexyl group, a 3-phenylhexyl group, a 4-phenylhexyl group, a 5-phenylhexyl group, and a 6-phenylhexyl group.

Examples of the aryl group represented by R in the formula of the general formula (6) include aryl groups having 6 to 18 carbon atoms. Specific examples include a phenyl group, a methylphenyl group, an ethylphenyl group, a dimethylphenyl group, a naphthyl group, an anthracenyl group, and a phenanthrenyl group.

As the aliphatic heterocyclic group represented by R in the formula of the general formula (6), for example, five-membered or six-membered aliphatic heterocyclic groups are preferred, and examples of the aliphatic heterocyclic group include aliphatic heterocyclic groups comprising one to three heteroatoms, for example, nitrogen atoms, oxygen atoms, or sulfur atoms, as different atoms. Specific examples include a pyrrolidyl-2-one group, a piperidino group, a piperazinyl group, a morpholino group, a tetrahydrofuryl group, and a tetrahydropyranyl group.

As the aromatic heterocyclic group represented by R in the formula of the general formula (6), for example, five-membered or six-membered monocyclic aromatic heterocyclic groups and polycyclic aromatic heterocyclic groups are preferred, and examples of the aromatic heterocyclic group include aromatic heterocyclic groups comprising one to three heteroatoms, for example, nitrogen atoms, oxygen atoms, or sulfur atoms, as different atoms. Specific examples include a pyridyl group, an imidazolyl group, a thiazolyl group, a furfuryl group, a pyranyl group, a furyl group, a benzofuryl group, and a thienyl group.

The alkoxy group represented by R in the formula of the general formula (6) may be linear or branched or may be cyclic. Examples of the alkoxy group include alkoxy groups having 1 to 6 carbon atoms. Specific examples include a methoxy group, an ethoxy group, a n-propoxy group, a 2-propoxy group, a n-butoxy group, a 2-butoxy group, an isobutoxy group, a tert-butoxy group, a n-pentyloxy group, a 2-methylbutoxy group, a 3-methylbutoxy group, a 2,2-dimethylpropyloxy group, a n-hexyloxy group, a 2-methylpentyloxy group, a 3-methylpentyloxy group, a 4-methylpentyloxy group, a 5-methylpentyloxy group, and a cyclohexyloxy group.

Examples of the aralkyloxy group represented by R in the formula of the general formula (6) include aralkyloxy groups having 7 to 12 carbon atoms. Specific examples include a benzyloxy group, a 2-phenylethoxy group, a 1-phenylpropoxy group, a 2-phenylpropoxy group, a 3-phenylpropoxy group, a 1-phenylbutoxy group, a 2-phenylbutoxy group, a 3-phenylbutoxy group, a 4-phenylbutoxy group, a 1-phenylpentyloxy group, a 2-phenylpentyloxy group, a 3-phenylpentyloxy group, a 4-phenylpentyloxy group, a 5-phenylpentyloxy group, a 1-phenylhexyloxy group, a 2-phenylhexyloxy group, a 3-phenylhexyloxy group, a 4-phenylhexyloxy group, a 5-phenylhexyloxy group, and a 6-phenylhexyloxy group.

Examples of the aryloxy group represented by R in the formula of the general formula (6) include aryloxy groups having 6 to 14 carbon atoms. Specific examples include a phenyloxy group, a naphthyloxy group, and an anthryloxy group.

The alkyloxycarbonyl group represented by R in the formula of the general formula (6) may be linear or branched. Examples of the alkyloxycarbonyl group include alkyloxycarbonyl groups having 2 to 7 carbon atoms. Specific examples include a methoxycarbonyl group, an ethoxycarbonyl group, a propoxycarbonyl group, a butoxycarbonyl group, a tert-butoxycarbonyl group, a pentyloxycarbonyl group, a hexyloxycarbonyl group, and a heptyloxycarbonyl group.

Examples of the aralkyloxycarbonyl group represented by R in the formula of the general formula (6) include aralkyloxycarbonyl groups having 8 to 12 carbon atoms. Specific examples include a benzyloxycarbonyl group and a phenylethoxycarbonyl group.

Examples of the substituted alkyl group represented by R in the formula of the general formula (6) include alkyl groups in which at least one hydrogen atom of the above alkyl groups is replaced by a substituent such as an alkyl group, a cycloalkyl group, an alkoxy group, a halogen atom, an amino group, or an amino group having a protecting group.

Examples of the substituted cycloalkyl group represented by R in the formula of the general formula (6) include cycloalkyl groups in which at least one hydrogen atom of the above cycloalkyl groups is replaced by a substituent such as an alkyl group, a cycloalkyl group, an alkoxy group, a halogen atom, an amino group, or an amino group having a protecting group.

Examples of the substituted aralkyl group represented by R in the formula of the general formula (6) include aralkyl groups in which at least one hydrogen atom of the above aralkyl groups is replaced by a substituent such as an alkyl group, a cycloalkyl group, an alkyl halide group, an alkoxy group, a halogen atom, an amino group, or an alkyl group-substituted amino group.

Examples of the substituted aryl group represented by R in the formula of the general formula (6) include aryl groups in which at least one hydrogen atom of the above aryl groups is replaced by a substituent such as an alkyl group, a cycloalkyl group, an alkyl halide group, an alkoxy group, a halogen atom, an amino group, or an alkyl group-substituted amino group, or aryl groups in which two adjacent hydrogen atoms of the above aryl groups are replaced by a substituent such as an alkylenedioxy group.

Examples of the substituted aliphatic heterocyclic group represented by R in the formula of the general formula (6) include aliphatic heterocyclic groups in which at least one hydrogen atom of the above aliphatic heterocyclic groups is replaced by a substituent such as an alkyl group, a cycloalkyl group, an alkyl halide group, an alkoxy group, or a halogen atom.

Examples of the substituted aromatic heterocyclic group represented by R in the formula of the general formula (6) include aromatic heterocyclic groups in which at least one hydrogen atom of the above aromatic heterocyclic groups is replaced by a substituent such as an alkyl group, a cycloalkyl group, an alkyl halide group, an alkoxy group, or a halogen atom.

Examples of the substituted alkoxy group represented by R in the formula of the general formula (6) include alkoxy groups in which at least one hydrogen atom of the above alkoxy groups is replaced by a substituent such as an alkyl group, a cycloalkyl group, an alkoxy group, a halogen atom, an amino group, or an amino group having a protecting group.

Examples of the substituted aralkyloxy group represented by R in the formula of the general formula (6) include aralkyloxy groups in which at least one hydrogen atom of the above aralkyloxy groups is replaced by a substituent such as an alkyl group, a cycloalkyl group, an alkyl halide group, an alkoxy group, a halogen atom, an amino group, or an alkyl group-substituted amino group.

Examples of the substituted aryloxy group represented by R in the formula of the general formula (6) include aryloxy groups in which at least one hydrogen atom of the above aryloxy groups is replaced by a substituent such as an alkyl group, a cycloalkyl group, an alkyl halide group, an alkoxy group, a halogen atom, an amino group, or an alkyl group-substituted amino group, or aryloxy groups in which two adjacent hydrogen atoms of the above aryloxy groups are replaced by an alkylenedioxy group or the like.

Examples of the substituted silyl group represented by R in the formula of the general formula (6) include silyl groups in which at least one hydrogen atom of a silyl group is replaced by a substituent such as an alkyl group, a cycloalkyl group, an alkyl halide group, an alkoxy group, a halogen atom, an amino group, an alkyl group-substituted amino group, or an aryl group.

Examples of the substituted silyloxy group represented by R in the formula of the general formula (6) include silyloxy groups in which at least one hydrogen atom of a silyloxy group is replaced by a substituent such as an alkyl group, a cycloalkyl group, an alkyl halide group, an alkoxy group, a halogen atom, an amino group, an alkyl group-substituted amino group, or an aryl group.

The above substituents, that is, the substituents in the substituted alkyl group, the substituted cycloalkyl group, the substituted aralkyl group, the substituted aryl group, the substituted aliphatic heterocyclic group, the substituted aromatic heterocyclic group, the substituted alkoxy group, the substituted aralkyloxy group, the substituted aryloxy group, and the substituted amino group will be described below.

Examples of the alkyl group, the cycloalkyl group, and the alkoxy group as the substituents include the examples of the alkyl group, the cycloalkyl group, and the alkoxy group represented by R described above, respectively. Examples of the halogen atom include a fluorine atom, a chlorine atom, a bromine atom, and an iodine atom.

Examples of the alkylenedioxy group include alkylenedioxy groups having 1 to 3 carbon atoms, and specific examples include a methylenedioxy group, an ethylenedioxy group, a propylenedioxy group, and a trimethylenedioxy group.

Examples of the alkyl halide group include alkyl halide groups having 1 to 6 carbon atoms in which the above alkyl groups are halogenated (for example, fluorinated, chlorinated, brominated, or iodinated). Specific examples include a chloromethyl group, a bromomethyl group, a trifluoromethyl group, a 2-chloroethyl group, a 3-chloropropyl group, a 3-bromopropyl group, and a 3,3,3-trifluoropropyl group.

Examples of the alkyl group-substituted amino group include amino groups in which one or two hydrogen atoms of an amino group are replaced by the above alkyl group(s) and/or the above cycloalkyl group(s). Specific examples of the alkyl group-substituted amino group include monosubstituted amino groups such as a methylamino group, an ethylamino group, a propylamino group, a butylamino group, a pentylamino group, and a hexylamino group, and disubstituted amino groups such as a dimethylamino group, a diethylamino group, a dipropylamino group, a dibutylamino group, a dipentylamino group, and a dihexylamino group.

As the protecting group, any one used as an amino-protecting group can be used, and examples thereof include those described in "PROTECTIVE GROUPS IN ORGANIC SYNTHESIS Second Edition (JOHN WILEY & SONS, INC.)" as amino-protecting groups. Specific examples of the amino-protecting group include an alkyl group, a cycloalkyl group, an aralkyl group, an acyl group, and an alkyloxycarbonyl group.

Examples of the alkyl group, the cycloalkyl group, and the aralkyl group here include the examples of the alkyl group, the cycloalkyl group, and the alkoxy group represented by R described above, respectively. The acyl group may be linear or branched or cyclic. Examples of the acyl group include acyl groups derived from carboxylic acids and, for example, having 2 to 7 carbon atoms. Specific examples include an acetyl group, a propionyl group, a butyryl group, a pentanoyl group, a hexanoyl group, and a benzoyl group. Examples of the alkyloxycarbonyl group include a tert-butyloxycarbonyl group and a benzyloxycarbonyl group.

Examples of the amino group having a protecting group include amino groups protected by the above protecting groups. Specific examples of the amino group having a protecting group include an acetylamino group, a benzoylamino group, a tert-butyloxycarbonylamino group, a benzyloxycarbonylamino group, and a cyclic amino group.

Examples of the cyclic amino group include cyclic amines in which an alkylene chain such as a butylene group or a pentylene group, a —CH$_2$CH$_2$OCH$_2$CH$_2$—, —CH$_2$CH$_2$NHCH$_2$CH$_2$—, or —CH$_2$CH$_2$OCO— group, or the like is bonded to a nitrogen atom, and specific examples thereof include a morpholino group, a piperidino group, and a 1,3-oxazolin-2-on-1-yl group.

Examples of the substituted amino group represented by R in the formula of the general formula (6) include those illustrated above as the amino group and the amino group having a protecting group.

Examples of the alkylaminocarboxy group, the substituted alkylaminocarboxy group, and the arylaminocarboxy group represented by R in the formula of the general formula (6) include those represented by —CON($R_m$)$_2$ ($R_m$ is a substituted or unsubstituted alkyl group having 1 to 8 carbon atoms, a substituted or unsubstituted aryl group having 6 to 12 carbon atoms, or a hydrogen atom, and at least one of $R_m$ is a substituted or unsubstituted alkyl group having 1 to 8 carbon atoms or a substituted or unsubstituted aryl group having 6 to 12 carbon atoms). Examples of the substituents in the substituted alkyl group and the substituted aryl group here include the same as those mentioned above as the examples of the substituents in the substituted alkyl group and the substituted aryl group represented by R.

Examples of the alkyloxycarbonyloxy group represented by R in the formula of the general formula (6) can include methoxycarbonyloxy, ethoxycarbonyloxy, n-propoxycarbonyloxy, isopropoxycarbonyloxy, n-butoxycarbonyloxy, isobutoxycarbonyloxy, tert-butoxycarbonyloxy, sec-butoxycarbonyloxy, n-pentyloxycarbonyloxy, neopentyloxycarbonyloxy, n-hexyloxycarbonyloxy, isohexyloxycarbonyloxy, a 3-methylpentyloxycarbonyloxy group, cyclopropyloxycarbonyloxy, cyclobutyloxycarbonyloxy, cyclopentyloxycarbonyloxy, cyclohexyloxycarbonyloxy, cycloheptyloxycarbonyloxy, and cyclooctyloxycarbonyloxy.

Examples of the aryloxycarbonyloxy group represented by R in the formula of the general formula (6) can include phenoxycarbonyloxy, 1-naphthyloxycarbonyloxy, and 2-naphthyloxycarbonyloxy.

Examples of the halogen atom represented by R in the formula of the general formula (6) include a fluorine atom, a chlorine atom, a bromine atom, and an iodine atom.

The diboron compound that is a starting raw material in the method for producing an organoboron compound according to the present invention is represented by the following general formula (7):

[Formula 23]

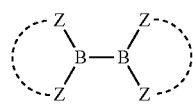

(7)

wherein Z represents the same or a different atom having a lone electron pair, and a dotted line connecting neighboring Z to each other indicates that another atom is bonded to Z; and neighboring Z optionally forms a ring with each other via another atom.

For Z in the diboron compound in the formula of the general formula (7), its type is not particularly limited as long as it is an atom having a lone electron pair, such as an oxygen atom or a nitrogen atom. Z has a lone electron pair, and thus the lone electron pair acts with the vacant orbital of adjacent boron, and the reactivity of the diboron compound becomes suitable. In the general formula (7), four Z may be the same or different. Two neighboring Z may form a ring via another atom or may not form a ring.

Examples of an atomic group forming a ring in the diboron compound represented by the general formula (7) include those shown in the following (7a) to (7c). Examples of an atomic group not forming a ring include those shown in the following (7d) to (7f).

[Formula 24]

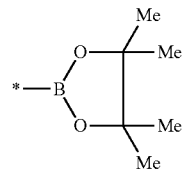 (7a)

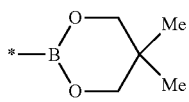 (7b)

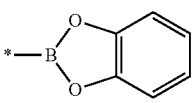 (7c)

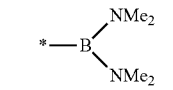 (7d)

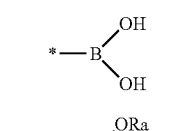 (7e)

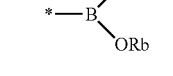 (7f)

wherein Ra and Rb represent the same or different optionally substituted alkyl groups or aryl groups; and * represents a bond.

Examples of the optionally substituted alkyl groups or aryl groups represented by Ra and Rb include the same as those mentioned above as the examples of the alkyl group, the substituted alkyl group, the aryl group, and the substituted aryl group represented by R.

It is preferred that the amount of the diboron compound represented by the general formula (7) added be in the range of 100 to 200 mol %, particularly 100 to 150 mol %, in the molar ratio to the alkene compound represented by the general formula (6).

In the method for producing an organoboron compound according to the present invention, the asymmetric catalyst used is a copper metal complex comprising the optically active 2,3-bisphosphinopyrazine derivative represented by the general formula (1) as a ligand. As the copper metal complex, a copper metal complex with a copper(I) salt is preferred, and particularly a copper metal complex with CuOtBu, which is a cationic copper(I) salt, is preferred.

The amount of the asymmetric catalyst used differs depending on the type of the alkene compound used, the reaction container used, the form of the reaction, the economy, and the like, and it is preferred that the amount be 0.1 to 20 mol %, particularly 0.5 to 10 mol %, based on the alkene compound.

In the method for producing an organoboron compound according to the present invention, t-butoxypotassium is preferably used as one component of the catalyst. A copper metal complex CuOtBu is produced with this additive, and the catalytic reaction proceeds in good yield. t-Butoxylithium or t-butoxysodium may be used, but t-butoxypotassium is preferred.

The amount of t-butoxypotassium used is preferably 1.0 to 5.0, more preferably 1.0 to 2.5, in the molar ratio to copper.

In the method for producing an organoboron compound according to the present invention, the reaction can be performed in a solvent as needed. The solvent is preferably one that dissolves the alkene compound that is a starting raw material and the organoboron compound that is a product, and does not react with the reaction reagents.

Specific examples of the solvent include aromatic hydrocarbons such as benzene, toluene, and xylene; aliphatic hydrocarbons such as pentane, hexane, heptane, and octane; halogenated hydrocarbons such as methylene chloride, chloroform, carbon tetrachloride, and dichloroethane; ethers such as diethyl ether, diisopropyl ether, tert-butyl methyl ether, dimethoxyethane, tetrahydrofuran (THF), tetrahydropyran (THP), dioxane, and dioxolane; amides such as N,N-dimethylformamide (DMF) and N,N-dimethylacetamide (DMA); acetonitrile, N-methylpyrrolidone (NMP), dimethyl sulfoxide (DMSO), and dimethylimidazolidinone (DMI). These solvents may be used singly or appropriate in combinations of two or more.

This reaction is hydroboration, and boron is enantioselectively inserted into a terminal alkene, and then the target is produced with hydrogen derived from another compound. For this purpose, alcohols are preferably used, methanol, ethanol, propanol, and the like can be particularly preferably used, and methanol is most preferred.

The reaction temperature is usually −78 to 20° C., and preferably −50 to 0° C. considering economy and chiral purity.

The reaction time differs depending on the type and amount of the catalyst used, the types and concentrations of the starting raw materials used, the reaction conditions such as reaction temperature, and the like and is usually 1 h or more, preferably 5 to 24 h.

After the completion of the reaction, purification by an ordinary method such as crystallization, distillation, column chromatography, preparative HPLC, liquid separation and washing, extraction, or solvent removal can be performed as needed, to obtain the target organoboron compound represented by the general formula (8).

The optically active organoboron compound obtained by this production method is used as a chiral intermediate raw material for medicines and agrochemicals, and physiologically active substances and is useful, for example, as a synthetic intermediate for antibiotics.

EXAMPLES

The present invention will be described in detail below by Examples, but the present invention is not limited to these Examples. For the identification of compounds, JNM-ECX400P and JNM-ECS400 manufactured by JEOL Ltd. were used. The analysis conditions were 1H NMR: 400 MHz, $^{13}$C NMR: 100 MHz, and $^{31}$P NMR: 160 MHz.

Example 1

[Formula 25]

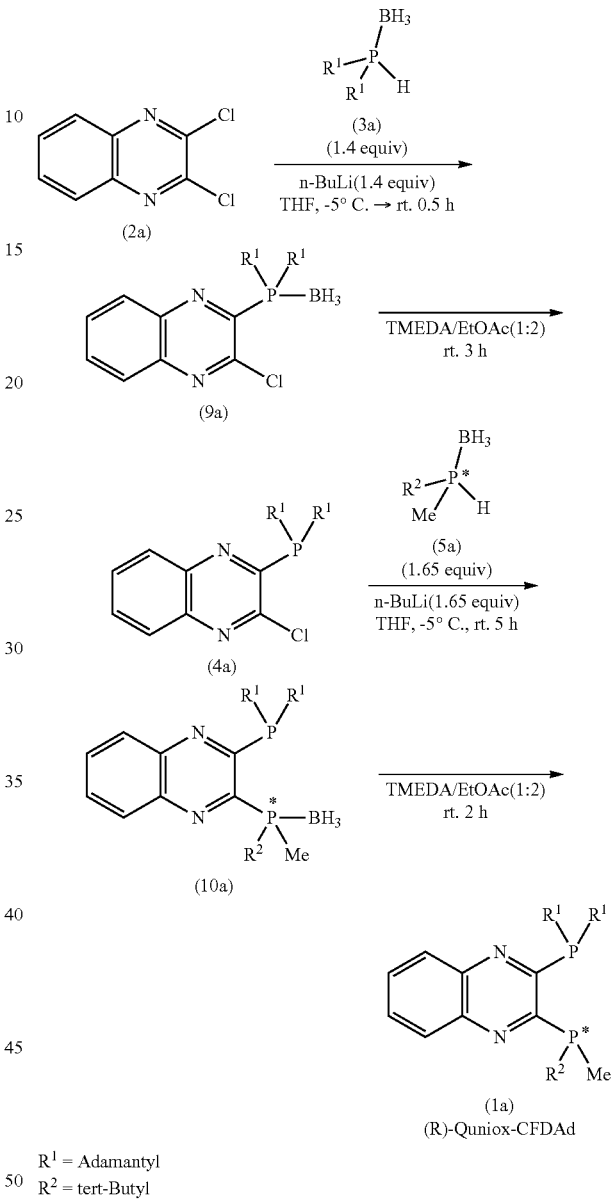

$R^1$ = Adamantyl
$R^2$ = tert-Butyl wherein $R^1$ represents an adamantyl group, $R^2$ represents a tert-butyl group, and * represents an asymmetric center on a phosphorus atom.

<First Step>

A phosphine-borane (3a) (1.68 mmol, 531.4 mg) was dissolved in dehydrated THF (3.6 ml). A hexane solution of n-BuLi (1.64 mol/L, 1.68 mmol, 1.02 ml) was dropped into this solution at −5° C. under a nitrogen atmosphere, and this was a B liquid.

2,3-Dichloroquinoxaline (2a) (1.2 mmol, 238.8 mg) was dissolved in THF (4.8 ml), and this was an A liquid.

The B liquid was dropped into the A liquid at 0° C. After the completion of the dropping, the mixture was stirred at room temperature for 30 min. Water was added to the reaction liquid for quenching, followed by extraction with hexane three times. Then, the organic layer was subjected to dehydration treatment with sodium sulfate and then filtered, and with the filtrate, the solvent was removed under reduced pressure by an evaporator to obtain an oily residue (phosphinopyrazine-borane derivative (9a)).

<Second Step>

Then, TMEDA (1.2 ml) and ethyl acetate (2.4 ml) were added to the oily residue, and the mixture was stirred at room temperature for 3 h. After the completion of the reaction, further ethyl acetate and a 1.5 M hydrochloric acid aqueous solution, and further water and brine were added to the reaction liquid to wash the reaction liquid well. Then, the organic layer was subjected to dehydration treatment with sodium sulfate and then filtered, and with the filtrate, the solvent was removed under reduced pressure by an evaporator to obtain a residue.

The obtained residue was purified by flash column chromatography (SiO$_2$, Et$_2$O/Hexane, volume ratio 0:100-2:98). Thus, a yellow solid phosphinopyrazine derivative (4a) (0.93 mmol, 433.8 mg, yield 78%) was obtained.

<Third Step>

An optically active phosphine-borane in the (S) form (5a) (0.825 mmol, 97.3 mg, >99% ee) was dissolved in dehydrated THF so that the concentration was 1.18 mol/L. A hexane solution of n-BuLi (1.55 mol/L, 1.65 equivalents based on a phosphine-borane of a formula (2a)) was dropped into this solution at −0° C. under a nitrogen atmosphere, and this was a D liquid.

DMF was added to the above-prepared phosphinopyrazine derivative (4a) (0.5 mmol, 232.5 mg) to adjust the concentration at 0.185 mol/L, and this was a C liquid.

The C liquid was dropped into the D liquid at −5° C., and the mixture was stirred at room temperature for 5 h. Water was added to the reaction liquid for quenching, followed by extraction with ethyl acetate two times. Then, the organic layer was washed with brine, subjected to dehydration treatment with sodium sulfate, and then filtered, and with the filtrate, the solvent was removed under reduced pressure by an evaporator to obtain an optically active phosphinopyrazine-borane derivative (10a).

<Fourth Step>

Then, TMEDA/ethyl acetate (volume ratio 1:2) was added to the optically active phosphinopyrazine-borane derivative (10a) to adjust the concentration at 0.07 mol/L, and the mixture was stirred at room temperature for 2 h. After the completion of the reaction, further ethyl acetate was added to the reaction liquid for extraction with the ethyl acetate. The organic layer was washed well with water, a 6 mol/L hydrochloric acid aqueous solution, and brine. Then, the organic layer was subjected to dehydration treatment with sodium sulfate and then filtered, and with the filtrate, the solvent was removed under reduced pressure by an evaporator to obtain a residue.

The obtained residue was purified by flash column chromatography (SiO$_2$, Et$_2$O/Hexane, volume ratio 0:100-2:98). Thus, an optically active 2,3-bisphosphinopyrazine derivative in the R form (1a) (hereinafter referred to as "(R)-Quinox-CFDAd") (0.39 mmol, 209 mg, yield 78%) was obtained. (Identification Data of (R)-Quinox-CFDAd) (1H NMR (392 MHz, CDCl$_3$, δ): 1.16 (d, J=12.1 Hz, 9H), 1.42 (d, J=5.4 Hz, 3H), 1.62-1.74 (m, 12H), 1.85-1.94 (m, 9H), 2.03-2.06 (m, 6H), 2.30-2.33 (m, 3H), 7.72 (dd, J=2.9, 6.5 Hz, 1H), 7.74 (dd, J=3.1, 6.7 Hz, 1H), 8.05-8.14 (m, 2H). $^{13}$C NMR (99 MHz, CDCl$_3$, δ): 6.8 (dd, J=7.5, 18.8 Hz, CH$_3$), 27.7 (d, J=14.1 Hz, CH$_3$), 28.9 (d, J=7.5 Hz, CH), 29.0 (d, J=7.5 Hz, CH), 31.2 (dd, J=3.3, 14.6 Hz, C), 36.9 (CH$_2$), 37.1 (CH$_2$), 39.4 (dd, J=4.7, 24.4 Hz, C), 40.1 (dd, J=2.8, 24.4 Hz, C), 41.5 (d, J=11.3 Hz, CH$_2$), 41.6 (d, J=11.3 Hz, CH$_2$), 129.4 (CH), 129.6 (CH), 129.7 (CH), 140.7 (C), 141.0 (C), 164.8 (t, J=30.5 Hz, C), 167.9 (t, J=31.0 Hz, C). $^{31}$P NMR (160 MHz, CDCl$_3$, δ): −14.9 (d, J=107.5 Hz), 21.4 (d, J=103.2 Hz). HRMS-ESI (m/z): [M+H]+ calcd for C$_{33}$H$_{47}$N$_2$P$_2$, 533.32090; found, 533.32086. [α] D$^{23.9}$−74.0 (c 0.52 in EtOAc). mp=203° C.)

Example 2

[Formula 26]

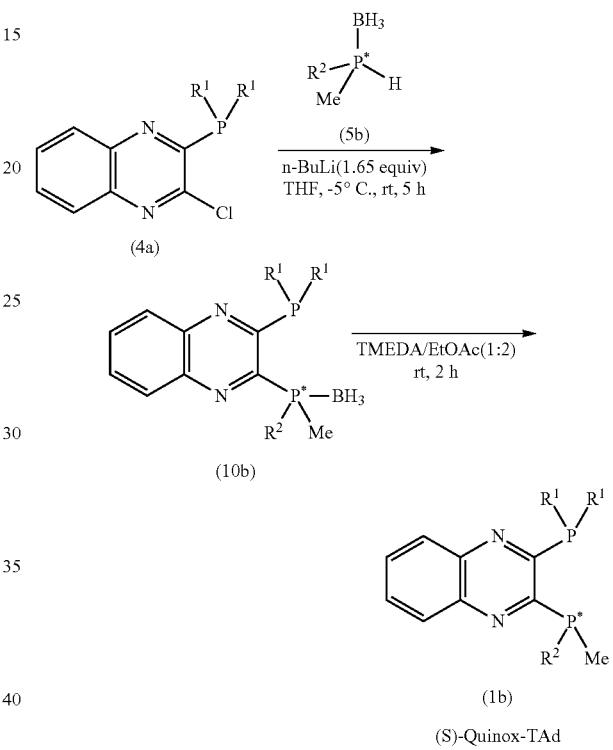

R$^1$ = Adamantyl
R$^2$ = Adamantyl wherein R$^1$ and R$^2$ represent an adamantyl group.

Reactions and purification were performed as in Example 1 except that in the third step and the fourth step, an optically active phosphine-borane in the (R) form (5b) (0.825 mmol, 97.3 mg, >99% ee) was used instead of the optically active phosphine-borane (5a) to form an optically active phosphinopyrazine-borane derivative (10b) (0.5 mmol, 232.5 mg). Thus, an optically active 2,3-bisphosphinopyrazine derivative in the S form (1b) (hereinafter referred to as "(S)-Quinox-TAd") (0.39 mmol, 209 mg, yield 78%) was obtained. (Identification Data of (S)-Quinox-TAd) ($^1$H NMR (392 MHz, CDCl$_3$, δ): 1.37 (d, J=5.4 Hz, 3H), 1.60-2.07 (m, 42H), 2.33-2.36 (m, 3H), 7.73 (dd, J=3.1, 6.7 Hz, 1H), 7.74 (dd, J=3.4, 6.5 Hz, 1H), 8.07-8.15 (m, 2H). $^{13}$C NMR (99 MHz, CDCl$_3$, δ): 4.6 (dd, J=8.5, 17.9 Hz, CH$_3$), 28, 6 (d, J=8.5 Hz, CH), 28.9 (d, J=8.5 Hz, CH), 29.0 (d, J=8.5 Hz, CH$_3$), 35.0 (dd, J=2.3, 15.5 Hz, C), 36.9 (CH$_2$), 37.07 (CH$_2$), 37.14 (CH$_2$) 39.0 (d, J=10.3 Hz, CH$_2$), 39.3 (dd, J=5.2, 24.9 Hz, C), 40.4 (dd, J=1.9, 24.4 Hz, C), 41.49 (d, J=11.3 Hz, C), 41.58 (d, J=6.6 Hz, CH$_2$), 41.59 (d, J=8.5 Hz, CH$_2$), 129.4 (CH), 129.50 (CH), 129.52 (CH), 129.7 (CH), 140.6 (C), 140.9 (C). $^{31}$P NMR (160 MHz, CDCl$_3$, δ): −16.8 (d, J=103.2 Hz), 21.5 (d, J=103.2 Hz). HRMS-ESI (m/z): [M+H]+ calcd for $C_{39}H_{53}N_2P_2$, 611.36785; found, 611.36810. [α] $D^{238}$+125.0 (c 0.52 in CHCl$_3$). mp=268° C.)

Example 3

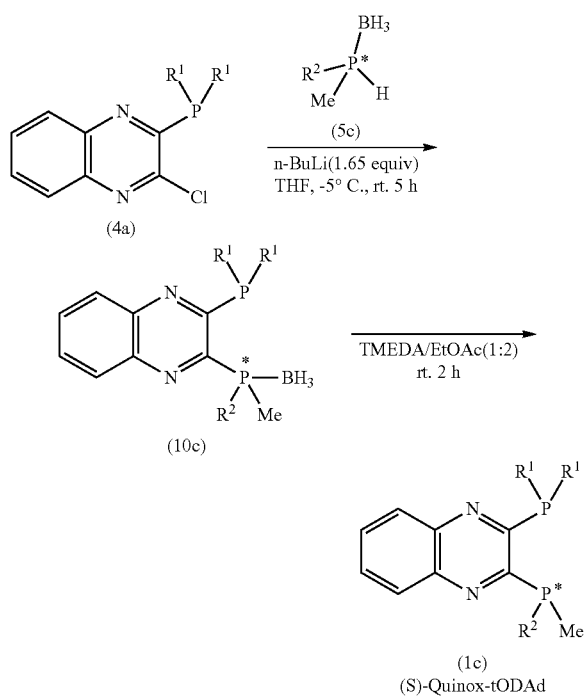

[Formula 27]

(4a) → (10c) → (1c) (S)-Quniox-tODAd $R^1$ = Adamantyl
$R^2$ = tert-Outyl wherein $R^1$ represents an adamantyl group, and $R^2$ represents a 1,1,3,3-tetramethylbutyl group.

Reactions and purification were performed as in Example 1 except that in the third step and the fourth step, an optically active phosphine-borane in the (R) form (5c) (0.825 mmol, 161.8 mg, >99% ee) was used instead of the optically active phosphine-borane (5a) to form an optically active phosphinopyrazine-borane derivative (10c) (0.5 mmol, 232.5 mg). Thus, an optically active 2,3-bisphosphinopyrazine derivative in the S form (1c) (hereinafter referred to as "(S)-Quniox-tODAd") (0.45 mmol, 273.4 mg, yield 90%) was obtained. (Identification Data of (S)-Quniox-tODAd) ($^1$H NMR (392 MHz, CDCl$_3$, δ): 0.99 (s, 9H), 1.29 (d, J=2.7 Hz, 3H), 1.33 (s, 3H), 1.40 (d, J=5.8 Hz, 3H), 1.48 (dd, J=7.4, 14.2 Hz, 1H), 1.62-1.73 (m, 12H), 1.83-1.93 (m, 10H), 2.03-2.07 (m, 6H), 2.30-2.33 (m, 3H), 7.72 (dd, J=3.4, 6.5 Hz, 1H), 7.74 (dd, J=3.4, 6.5 Hz, 1H), 8.06-8.09 (m, 1H), 8.11-8.14 (m, 1H). $^{13}$C NMR (99 MHz, CDCl$_3$, δ): 6.7 (dd, J=7.5, 20.7 Hz, CH$_3$), 25.1 (d, J=14.1 Hz, CH$_3$), 25.4 (d, J=9.4 Hz, CH$_3$), 28.9 (d, J=4.7 Hz, CH), 29.0 (d, J=5.6 Hz, CH), 32.3 (CH$_3$), 33.7 (d, J=11.3 Hz, C), 36.5 (dd, J=2.8, 16.9 Hz, C), 36.9 (CH$_2$), 37.1 (CH$_2$), 39.4 (dd, J=4.7, 24.4 Hz, C), 40.1 (dd, J=2.4, 24.9 Hz, CH$_2$), 41.6 (d, J=11.3 Hz, CH$_2$), 41.6 (d, J=9.4 Hz, CH$_2$), 51.2 (d, J=17.9 Hz, CH$_2$), 129.4 (CH), 129.6 (CH), 129.7 (CH), 140.6 (C), 140.9 (C), 165.0 (t, J=30.1 Hz, C), 168.1 (t, J=32.4 Hz, C). $^{31}$P NMR (160 MHz, CDCl$_3$, δ): −9.5 (d, J=103.2 Hz), 21.6 (d, J=103.2 Hz). HRMS-ESI (m/z): [M+H]+ calcd for $C_{37}H_{55}N_2P_2$, 589.38350; found, 589.38371. [α] $D^{23.2}$+126.4 (c 0.51 in EtOAc). mp=214° C.)

Example 4

[Formula 28]

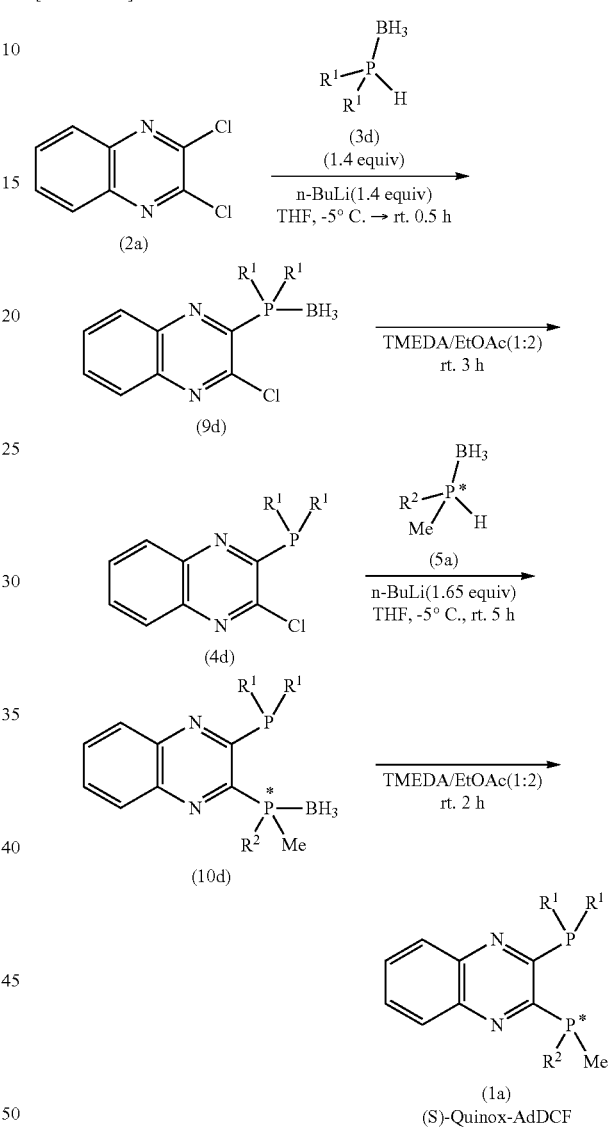

(2a) → (9d) → (4d) → (10d) → (1a) (S)-Quniox-AdDCF $R^1$ = tert-Butyl
$R^2$ = Adamantyl wherein $R^1$ represents a tert-butyl group, and $R^2$ represents an adamantyl group.

A phosphine-borane (3d) was used instead of the phosphine-borane (3a) in the first step to obtain a phosphinopyrazine derivative (4d) in the second step.

Then, in the third step and the fourth step, reactions and purification were performed as in Example 1 except that the optically active phosphine-borane in the (R) form (5b) (0.495 mmol, 97.1 mg, >99% ee) was used instead of the optically active phosphine-borane (5a) to form an optically active phosphinopyrazine-borane derivative (10d) (0.3 mmol, 92.6 mg). Thus, an optically active 2,3-bisphosphinopyrazine derivative in the S form (1d) (hereinafter referred to as "(S)-Quniox-AdCF") (0.26 mmol, 119 mg, yield 87%) was obtained. (Identification Data of (S)-Quniox-AdCF) (¹H NMR (392 MHz, CDCl₃, δ): 1.17 (d, J=11.2 Hz, 9H), 1.37 (d, J=11.7 Hz, 9H), 1.38 (d, J=7.2 Hz, 3H), 1.61-1.69 (m, 6H), 1.77-1.80 (m, 3H), 1.90-1.94 (m, 6H), 7.70-7.75 (m, 2H), 8.07-8.10 (m, 2H). ¹³C NMR (99 MHz, CDCl₃, δ): 4.3 (dd, J=8.5, 17.9 Hz, CH₃), 28.6 (d, J=8.5 Hz, CH), 30.4 (dd, J=2.4, 12.7 Hz, CH₃), 30.7 (d, J=14.1 Hz, CH₃), 34.3 (dd, J=5.4, 23.7 Hz, C), 35.0 (dd, J=1.9, 15.5 Hz, C), 35.5 (dd, J=1.9, 24.0 Hz, C), 37.0 (CH₂), 38.9 (d, J=10.8 Hz, CH₂), 129.48 (CH), 129.50 (CH), 129.56 (CH), 129.64 (CH), 140.9 (C), 141.0 (C), 166.3 (t, J=32.2 Hz, C), 166.7 (t, J=31.0 Hz, C). ³¹P NMR (160 MHz, CDCl₃, δ): −16.8 (d, J=105.3 Hz), 21.4 (d, J=107.5 Hz). HRMS-ESI (m/z): [M+H]+ calcd for C₂₇H₄₁N₂P₂, 455.27395; found, 455.27371. [α] D²²⁸+150.9 (c 1.0 in EtOAc). mp=116° C.)

Example 5

[Formula 29]

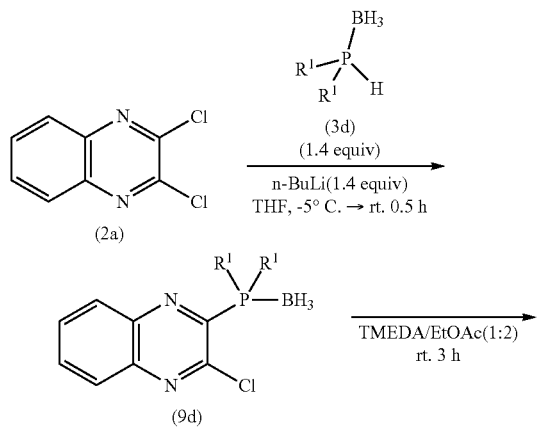

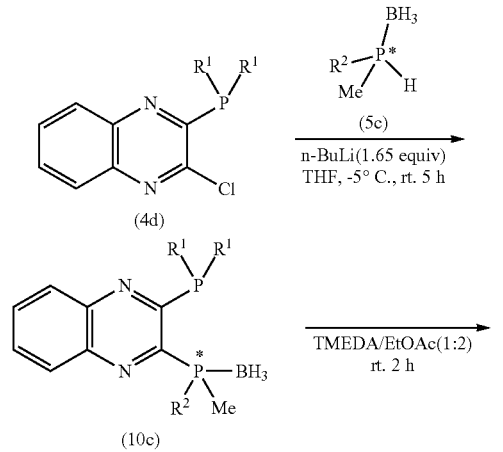

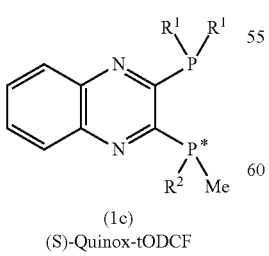

R¹ = tert-Butyl
R² = tert-Octyl wherein R¹ represents a tert-butyl group, and R₂ represents a 1,1,3,3-tetramethylbutyl group.

The phosphine-borane (3d) was used instead of the phosphine-borane (3a) in the first step to obtain the phosphinopyrazine derivative (4d).

Then, in the third step and the fourth step, reactions and purification were performed as in Example 1 except that the optically active phosphine-borane in the (R) form (5c) (0.84 mmol, 146.2 mg, >99% ee) was used instead of the optically active phosphine-borane (5a) to form an optically active phosphinopyrazine-borane derivative (10e) (0.6 mmol, 185.3 mg). Thus, an optically active 2,3-bisphosphinopyrazine derivative in the S form (1e) (hereinafter referred to as "(S)-Quinox-tODCF") (0.49 mmol, 211 mg, yield 81%) was obtained. (Identification Data of (S)-Quinox-tODCF) (¹H NMR (392 MHz, CDCl₃, δ): 1.00 (s, 9H), 1.20 (d, J=11.8 Hz, 9H), 1.30 (d, J=5.4 Hz, 3H), 1.33 (d, J=3.1 Hz, 3H), 1.35 (d, J=11.7 Hz, 9H), 1.41 (d, J=5.8 Hz, 3H), 1.52 (dd, J=7.2, 14.4 Hz, 1H), 1.82 (dd, J=9.0, 14.3 Hz, 1H), 7.69-7.75 (m, 2H), 8.05-8.10 (m, 2H). ¹³C NMR (99 MHz, CDCl₃, δ): 6.5 (dd, J=8.2, 20.4 Hz, CH₃), 25.0 (d, J=12.2 Hz, CH₃), 25.6 (d, J=10.8 Hz, CH₃), 30.5 (d, J=10.8 Hz, CH₃), 30.6 (d, J=13.6 Hz, CH₃), 33.6 (d, J=11.3 Hz, C), 34.4 (dd, J=4.7, 23.5 Hz, C), 35.2 (dd, J=2.3, 23.5 Hz, C), 36.3 (dd, J=3.5, 16.7 Hz, C), 51.1 (d, J=17.4 Hz, CH₂), 129.35 (CH), 129.44 (CH), 129.5 (CH), 129.7 (CH), 140.84 (C), 140.92 (C), 166.5 (t, J=30.8 Hz, C), 167.6 (dd, J=31.0, 33.4 Hz, C). ³¹P NMR (160 MHz, CDCl₃, δ): −9.4 (d, J=105.3 Hz), 21.3 (d, J=103.2 Hz). HRMS-ESI (m/z): [M+H]+ calcd for C₂₅H₄₃N₂P₂, 433.28960; found, 433.28928. [α] D²⁴·⁰+83.6 (c 0.52 in EtOAc). mp=121° C.

Comparative Example 1

[Formula 30]

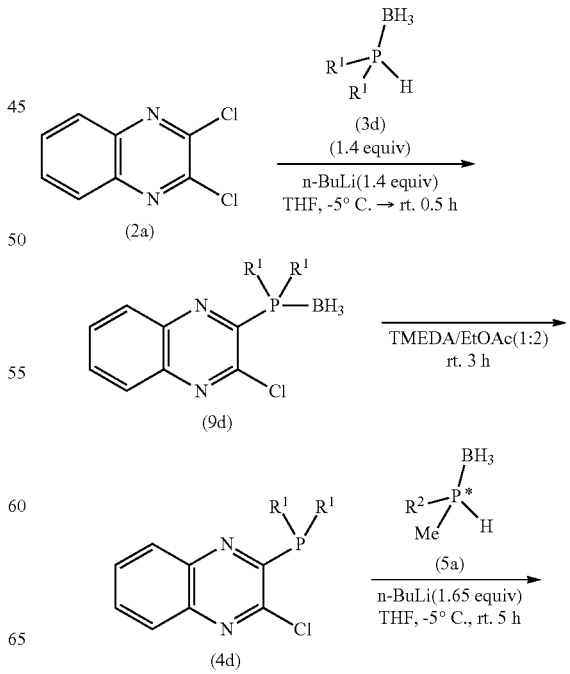

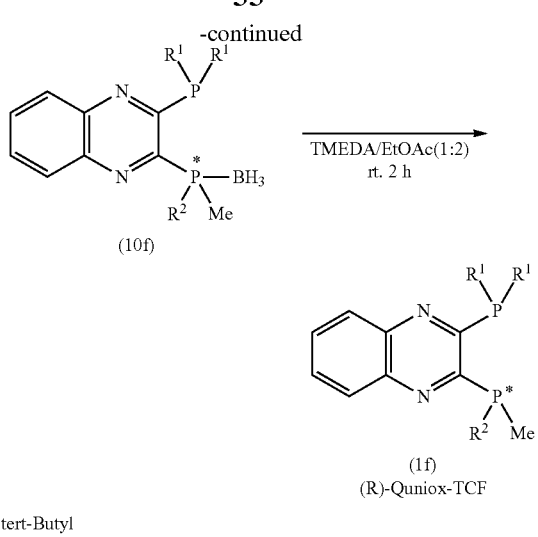

$R^1$ = tert-Butyl
$R^2$ = tert-Butyl wherein $R^1$ and $R^2$ represent a tert-butyl group.

The phosphine-borane (3d) was used instead of the phosphine-borane (3a) in the first step to obtain the phosphinopyrazine derivative (4d).

Then, reactions and purification were performed as in Example 1 except that in the third step, an optically active phosphinopyrazine-borane derivative (10f) was obtained. Thus, an optically active 2,3-bisphosphinopyrazine derivative in the R form (1f) (hereinafter referred to as "(R)-Quinox-TCF")") (yield 95%) was obtained.

(Identification Data of (R)-Quinox-TCF)

$^1$HNMR (500 MHz, CDCl$_3$) δ 1.15 (d, J=12.0 Hz, 9H), 1.19 (d, J=11.5 Hz, 9H), 1.34 (d, J=11.8 Hz, 9H), 1.41 (d, J=5.5 Hz, 3H), 7.67-7.76 (m, 2H), 8.03-8.12 (m, 2H); $^{13}$C NMR (125 MHz, CDCl$_3$) δ6.7 (d, J=8.4 Hz), 27.7 (d, J=13.2 Hz), 30.5 (d, J=13.2 Hz), 30.7 (d, J=13.2 Hz), 31.3 (dd, J=14.4, 2.4 Hz), 34.5 (dd, J=24.0, 4.8 Hz), 35.3 (dd, J=22.8, 2.4 Hz), 129.5, 129.6, 129.7, 129.8, 141.1, 141.2, 166.4 (t, J=31.2 Hz), 167.5 (dd, J=33.7, 28.8 Hz); $^{31}$P NMR (202 MHz, CDCl$_3$,) δ−14.4 (dm, J=107 Hz), 21.6 (dm, J=107 Hz); [α] D$^{25}$ −46.0 (c0.5, EtOAc); HRMS-ESI (m/z) [M+H]+ calcd for $C_{21}H_{35}N_2P_2^+$, 377.2275; found, 377.2299. mp; 165-167° C.

Example 6

Enantioselective Markovnikov Hydroboration Reaction

[Formula 31]

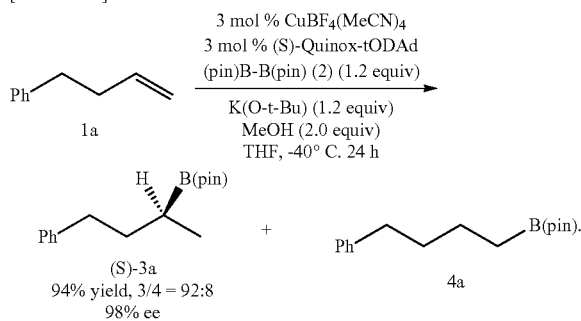

CuBF$_4$(MeCN)$_4$ (4.7 mg, 0.015 mmol), (S)-Quinox-tO-DAd (8.8 mg, 0.015 mmol), and bispinacolatodiboron (2) (152.4 mg, 0.6 mmol) were placed in a dried reaction container. The container was hermetically sealed with a Teflon (registered trademark)-coated septum, and pressure reduction and nitrogen sealing were performed three times to place the interior of the reaction container under a nitrogen atmosphere. Next, THF (0.4 mL) and a K(O-t-Bu) (t-butoxypotassium)/THF solution (1.0 mol/L, 0.6 mL, 0.6 mmol) were injected by a syringe, and the mixture was stirred at −40° C. for 30 min. Then, an alkene compound 1a (66.1 mg, 0.5 mmol) and methanol (40.4 μL, 1.0 mmol) were each dropped into the reaction solution using a syringe. The reaction solution was stirred at −40° C. for 24 h, and then the reaction solution was passed through a column (diameter: 10 mm, height: 30 mm) packed with a small amount of silica gel, and washed with diethyl ether. The solvent was removed by an evaporator, and the obtained material was purified using flash column chromatography (SiO$_2$, Et$_2$O/hexane, volume ratio 0:100-4:96), and thus the target hydroboration product (S)-3a was obtained as a colorless transparent liquid with a yield of 94%, 3a/4a=92:8, and 98% ee (122.0 mg, 0.47 mmol). Ph in the above reaction formula means a phenyl group.

It was confirmed by 1H NMR and $^{31}$P NMR that in the reaction liquid, (S)-Quinox-tODAd and Cu(O-t-Bu) formed a complex in a molar ratio of 1:1.

Examples 7 to 10 and Comparative Example 1

Organoboron compounds were obtained by the same procedure as in Example 6 with the ligand changed. The results are shown together in Table 1.

It was confirmed by 1H NMR and $^{31}$P NMR that in each of the reaction liquids, the 2,3-bisphosphinopyrazine derivative described in Table 1 and Cu(O-t-Bu) and the 2,3-bisphosphinopyrazine derivative formed a complex in a molar ratio of 1:1. In the following table, "3a" in the "3a:4a" ratio represents the amount of the S form. In the following Table 1, "Optical purity of 3a" is the optical purity of the S form, and is minus when the amount of the R form is larger than that of the S form.

TABLE 1

| | Ligand | Yield (%) | 3a/4a[1)] | Optical purity of 3a (ee %) |
|---|---|---|---|---|
| Example 6 | (S)-Quinox-tODAd | 94 | 92:8 | 98 |
| Example 7 | (R)-Quinox-CFDAd | 40 | 84:16 | −91 |
| Example 8 | (S)-Quinox-TAd | 85 | 86:14 | 97 |
| Example 9 | (S)-Quinox-AdDCF | 69 | 82:18 | 91 |
| Example 10 | (S)-Quinox-tODCF | 37 | 80:20 | 93 |
| Comparative Example 1 | (R)-Quinox-TCF | 39 | 78:22 | −87 |

Note)
[1)]3a/4a is an area ratio measured by gas chromatography

Examples 11 to 15

Target hydroboration products were obtained as in Example 6 except that the amounts of CuBF$_4$(MeCN)$_4$ and (S)-Quniox-tODAd were each 5 mol % based on the alkene compound, and the compounds shown in Table 2 were used as the alkene compound. The results are shown together in Table 2. In Table 2, Ph means a phenyl group, Me means a methyl group, and Bn means a benzyl group. In the following Table 2, "3b" in the "3b:4b" ratio represents the amount of the S form. In the following Table 2, "Optical purity of 3b" is the optical purity of the S form.

[Formula 32]

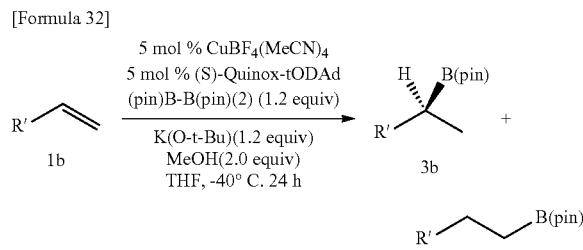

TABLE 2

| Type of R' in alkene compound general formula (1b) | Yield (%) | 3b/4b[2] | Optical purity of 3b (ee %) |
|---|---|---|---|
| Example 11 | CH$_3$—(CH$_2$)$_7$— | 64 | 90:10 | 96 |
| Example 12 | Ph—(CH$_2$)— | 88 | 85:15 | 99 |
| Example 13 | Cl—(CH$_2$)$_4$— | 89 | 86:14 | 98 |
| Example 14 | Ph$_2$MeSiO—(CH$_2$)$_3$— | 52 | 89:11 | 97 |
| Example 15 | BnO—(CH$_2$)$_4$— | 60 | 88:12 | 95 |

Note)
[2] 3b/4b is an area ratio measured by gas chromatography

Example 16

[Formula 33]

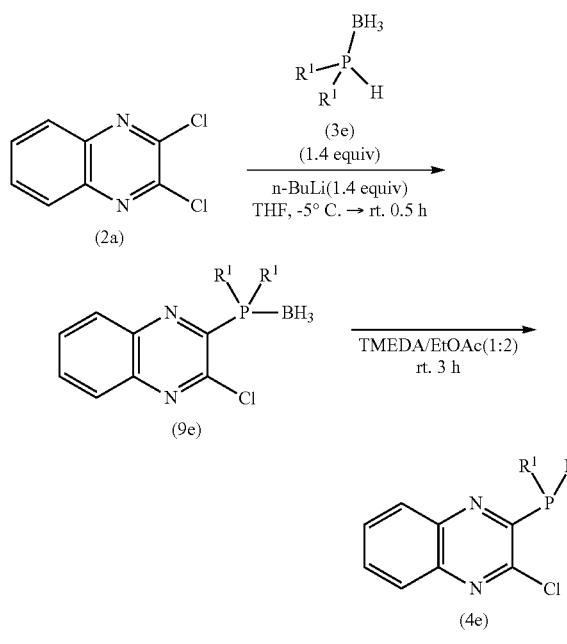

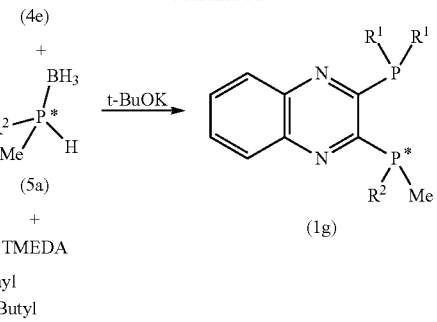

TMEDA

R$^1$ = Phenyl
R$^2$ = tert-Butyl wherein R$^1$ represents a phenyl group, and R$^2$ represents a tert-butyl group.

<First Step and Second Step>

A phosphinopyrazine derivative (4e) was obtained as in Example 1 except that a phosphine-borane (3e) was used instead of the phosphine-borane (3b).

<Ath Step>

The phosphinopyrazine derivative (4e) (1.05 g, 3 mmol) and the (S)-t-butylmethylphosphineborane (5a) (390 mg, 3.3 mmol) were placed in a 30 mL three-necked flask equipped with a three-way cock, a pressure-equalizing dropping funnel, and a septum, and the interior of the system was purged with argon. Dehydrated THF (7.5 mL) and N,N,N',N'-tetramethylethylenediamine (1.3 mL, 9.0 mmol) were added by a syringe through the septum (Y liquid). The flask was immersed in a low temperature bath at −20° C., and while the Y liquid was stirred by a magnetic stirrer, a 1.0 M THF solution of potassium tert-butoxide (Z liquid) (3.6 mL, 3.6 mmol) was dropped into the Y liquid over 20 min. After the dropping, the mixture was maintained at the same temperature for 30 min, and then the temperature was increased to room temperature over about 1 h, and further stirring was continued for 4 h. The flask was immersed in an ice water bath, ethyl acetate (10 mL), water (7 mL), and 2 M hydrochloric acid (6.5 mL) were sequentially added, and the mixture was stirred well. The mixture was transferred to a separatory funnel, and the upper layer was separated. The lower layer was subjected to extraction with ethyl acetate, and the organic layers were combined, washed with a saturated saline solution, and then dried with anhydrous sodium sulfate. The solvent was distilled off by an evaporator followed by vacuum drying to obtain an amorphous solid (1.22 g, 98%). Methanol (7 mL) was added to this product, and the mixture was stirred well by a spatula for crystallization. The obtained solid was filtered using a glass filter, and washed with methanol. The solid after the washing was vacuum-dried to obtain a yellow powder (990 mg, 78%). Then, 950 mg of this yellow powder was dissolved in 1.9 mL of THF at room temperature, 3.8 mL of methanol was added, and the mixture was cooled with ice water. After 2 h, the crystals were filtered, washed with an ice-cooled THF/MeOH (volume ratio 1:2) mixed solvent, and vacuum-dried to obtain a pure product of 720 mg of (R)-2-tert-butylmethylphosphino-3-diphenylphosphinoquinoxaline (1 g) as orange crystals (recrystallization recovery rate: 76%).

(Identification Data of (R)-2-tert-butylmethylphosphino-3-diphenylphosphinoquinoxaline (1 g))

mp 136-137° C. (Recrystallization from THF/MeOH)
[α]$_D^{28}$=−52.7 (c 1.00, AcOEt)
R$_f$=0.68 (AcOEt/hexane=1:5)

$^1$H NMR (500 MHz, CDCl$_3$)) δ1.11 (d, $J_{HP}$=12.0 Hz, 9H), 1.29 (d, $J_{HP}$=5.2 Hz, 3H), 7.25-7.36 (m, 8H), 7.43-7.48 (m, 2H), 7.61-7.71 (m, 2H), 7.87 (dd, J=8.1, 1.5 Hz, 1H), 8.08 (dd, J=8.6, 1.2 Hz, 1H).

$^{13}$C NMR (125 MHz, CDCl$_3$) δ5.7, 27.8 (d, $J_{CP}$=14.3 Hz), 31.6 (d, $J_{cp}$=14.3 Hz), 128.07, 128.12, 128.41, 128.47, 129.5, 129.83, 129.87, 134.4, 134.5, 135.0, 135.2, 136.4-136.8 (m).

$^{31}$P NMR (200 MHz, CDCl$_3$) δ −17.1 (d, $J_{PP}$=108 Hz), −6.5 (d, $J_{PP}$=108 Hz).

HRMS: calcd for C$_{25}$H$_{26}$N$_2$BP$_2$: 416.1571; found: 416.1593.

INDUSTRIAL APPLICABILITY

According to the present invention, it is possible to provide a novel optically active 2,3-bisphosphinopyrazine derivative having an asymmetric center on a phosphorus atom useful for catalytic asymmetric synthesis reactions. The 2,3-bisphosphinopyrazine derivative of the present invention is useful particularly as the ligand of a catalyst for the asymmetric hydroboration reaction of an alkene compound.

In addition, according to the production method of the present invention, the optically active 2,3-bisphosphinopyrazine derivative of the present invention can be easily produced.

Further, a transition metal complex, particularly a transition metal complex with a copper metal, comprising the optically active 2,3-bisphosphinopyrazine derivative of the present invention as a ligand, and an asymmetric catalyst having the same have high regioselectivity and high enantioselectivity and reaction activity for an asymmetric Markovnikov type hydroboration reaction using a terminal alkene.

Further, in the method for producing an organoboron compound according to the present invention, by using the catalyst of the present invention, the desired organoboron compound can be produced by an industrially advantageous method due to high regioselectivity and high enantioselectivity.

The invention claimed is:

1. A compound represented by formula (1):

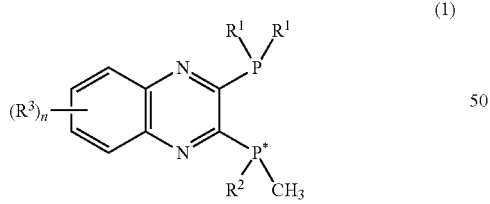

or a stereoisomer thereof,
wherein:
each R$^1$ represents alkyl, cycloalkyl, adamantyl, or aryl, wherein the alkyl is branched and has 3 or more carbon atoms, and further wherein each cycloalkyl is optionally substituted with 1 or more substituents independently selected from the group consisting of F, Cl, Br, I, alkyl, NH$_2$, NH(alkyl), NH(aralkyl), NH(acyl), NHC(O)O(alkyl), NH(cycloalkyl), O(alkyl), and cycloalkyl, and each aryl is optionally substituted with 1 or more substituents independently selected from the group consisting of F, Cl, Br, I, alkyl, haloalkyl, NH$_2$, NH(alkyl), N(alkyl)$_2$, O(alkyl), and cycloalkyl, or two vicinal aryl substituents, together with the carbon atoms to which they are attached, form a fused alkylenedioxy moiety;

R$^2$ represents alkyl, cycloalkyl, or adamantyl, wherein the alkyl is branched and has 3 or more carbon atoms, and further wherein the cycloalkyl is optionally substituted with 1 or more substituents independently selected from the group consisting of F, Cl, Br, I, alkyl, NH$_2$, NH(alkyl), NH(aralkyl), NH(acyl), NHC(O)O(alkyl), NH(cycloalkyl), O(alkyl), and cycloalkyl;

each R$^3$ independently represents F, Cl, Br, I, C$_{1-5}$ alkyl, NH$_2$, NO$_2$, OH, or O(alkyl);

n represents 0, 1, 2, 3, or 4; and represents an assymetric center on a phosphorous atom;
with the provisos that:
(1) both R$^1$ are identical; and
(2) when R$^1$ is tert-butyl, R$^1$ and R$^2$ are not identical.

2. The compound according to claim 1, or a stereoisomer thereof, wherein:
each R$^1$ represents tert-butyl; and
R$^2$ represents 1,1,3,3-tetramethylbutyl or adamantyl.

3. The compound according to claim 1, or a stereoisomer thereof, wherein:
each R$^1$ represents adamantyl or phenyl; and
R$^2$ represents tert-butyl, 1,1,3,3-tetramethylbutyl, or adamantyl.

4. A process for preparing a compound represented by formula (1):

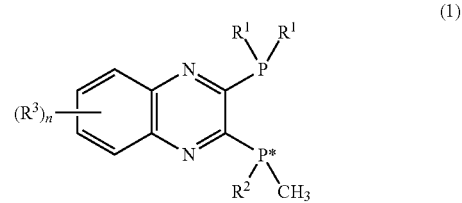

or a stereoisomer thereof,
wherein:
each R$^1$ represents alkyl, cycloalkyl, adamantyl, or aryl, wherein each alkyl is branched and has 3 or more carbon atoms, and further wherein each cycloalkyl is optionally substituted with 1 or more substituents independently selected from the group consisting of F, Cl, Br, I, alkyl, NH$_2$, NH(alkyl), NH(aralkyl), NH(acyl), NHC(O)O(alkyl), NH(cycloalkyl), O(alkyl), and cycloalkyl, and each aryl is optionally substituted with 1 or more substituents independently selected from the group consisting of F, Cl, Br, I, alkyl, haloalkyl, NH$_2$, NH(alkyl), N(alkyl)$_2$, O(alkyl), and cycloalkyl, or two vicinal aryl substituents, together with the carbon atoms to which they are attached, form a fused alkylenedioxy moiety;

R$^2$ represents alkyl, cycloalkyl, or adamantyl, wherein the alkyl is branched and has 3 or more carbon atoms, and further wherein the cycloalkyl is optionally substituted with 1 or more substituents independently selected from the group consisting of F, Cl, Br, I, alkyl, NH$_2$, NH(alkyl), NH(aralkyl), NH(acyl), NHC(O)O(alkyl), NH(cycloalkyl), O(alkyl), and cycloalkyl;

each $R^3$ independently represents F, Cl, Br, I, $C_{1-5}$ alkyl, $NH_2$, $NO_2$, OH, or O(alkyl);

n represents 0, 1, 2, 3, or 4; and

* represents an assymetric center on a phosphorous atom;

with the provisos that:
(1) both $R^1$ are identical; and
(2) when $R^1$ is tert-butyl, $R^1$ and $R^2$ are not identical;

comprising the following steps:
(1) reacting a compound represented by formula (2):

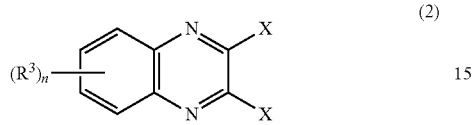
(2)

wherein:
each X independently represents Cl, Br, or I;
each $R^3$ independently represents F, Cl, Br, I, $C_{1-5}$ alkyl, $NH_2$, $NO_2$, OH, or O(alkyl); and
n represents 0, 1, 2, 3, or 4;

with a deprotonated form of a compound represented by formula (3):

(3)

wherein:
each $R^1$ represents alkyl, cycloalkyl, adamantyl, or aryl, wherein each alkyl is branched and has 3 or more carbon atoms, and further wherein each cycloalkyl is optionally substituted with 1 or more substituents independently selected from the group consisting of F, Cl, Br, I, alkyl, $NH_2$, NH(alkyl), NH(aralkyl), NH(acyl), NHC(O)O(alkyl), NH(cycloalkyl), O(alkyl), and cycloalkyl, and each aryl is optionally substituted with 1 or more substituents independently selected from the group consisting of F, Cl, Br, I, alkyl, haloalkyl, $NH_2$, NH(alkyl), $N(alkyl)_2$, O(alkyl), and cycloalkyl, or two vicinal aryl substituents, together with the carbon atoms to which they are attached, form a fused alkylenedioxy moiety;

with the proviso that both $R^1$ are identical;

in the presence of a deboranating agent selected from the group consisting of N,N,N',N'-tetramethylethylenediamine, 1,4-diazabicyclo[2.2.2]octane, triethylamine, tetrafluoroboric acid, and trifluoromethanesulfonic acid, to provide a compound represented by formula (4):

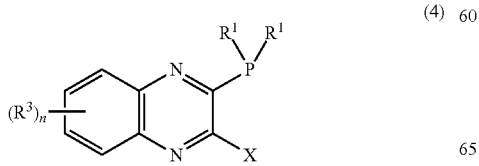
(4)

wherein:
X represents Cl, Br, or I;
each $R^1$ represents alkyl, cycloalkyl, adamantyl, or aryl, wherein each alkyl is branched and has 3 or more carbon atoms, and further wherein the cycloalkyl is optionally substituted with 1 or more substituents independently selected from the group consisting of F, Cl, Br, I, alkyl, $NH_2$, NH(alkyl), NH(aralkyl), NH(acyl), NHC(O)O(alkyl), NH(cycloalkyl), O(alkyl), and cycloalkyl, and each aryl is optionally substituted with 1 or more substituents independently selected from the group consisting of F, Cl, Br, I, alkyl, haloalkyl, $NH_2$, NH(alkyl), $N(alkyl)_2$, O(alkyl), and cycloalkyl, or two vicinal aryl substituents, together with the carbon atoms to which they are attached, form a fused alkylenedioxy moiety;
each $R^3$ independently represents F, Cl, Br, I, $C_{1-5}$ alkyl, $NH_2$, $NO_2$, OH, or O(alkyl); and
n represents 0, 1, 2, 3, or 4;

with the proviso that both $R^1$ are identical; and (2) reacting the compound of formula (4) above with a deprotonated form of a compound represented by formula (5):

(5)

wherein:
$R^2$ represents alkyl, cycloalkyl, or adamantyl, wherein the alkyl is branched and has 3 or more carbon atoms, and further wherein the cycloalkyl is optionally substituted with 1 or more substituents independently selected from the group consisting of F, Cl, Br, I, alkyl, $NH_2$, NH(alkyl), NH(aralkyl), NH(acyl), NHC(O)O(alkyl), NH(cycloalkyl), O(alkyl), and cycloalkyl; and

* represents an assymetric center on a phosphorous atom;

in the presence of a deboranating agent selected from the group consisting of N,N,N',N'-tetramethylethylenediamine, 1,4-diazabicyclo[2.2.2]octane, triethylamine, tetrafluoroboric acid, and trifluoromethanesulfonic acid, to provide the compound represented by formula (1) above.

5. A process for preparing a compound represented by formula (1'):

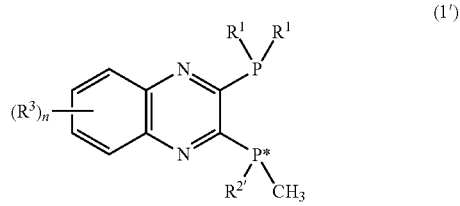
(1')

or a stereoisomer thereof, wherein:
each $R^1$ represents alkyl, cycloalkyl, adamantyl, or aryl, wherein each alkyl is branched and has 3 or more carbon atoms, and further wherein each cycloalkyl is optionally substituted with 1 or more substituents independently selected from the group consisting of F, Cl, Br, I, alkyl, $NH_2$, NH(alkyl), NH(aralkyl), NH(acyl), NHC(O)O(alkyl), NH(cycloalkyl), O(alkyl), and cycloalkyl, and each aryl is optionally substituted with 1 or more substituents independently selected from the group consisting of F, Cl, Br, I, alkyl, haloalkyl, $NH_2$, NH(alkyl), N(alkyl)$_2$, O(alkyl), and cycloalkyl, or two vicinal aryl substituents, together with the carbon atoms to which they are attached, form a fused alkylenedioxy moiety;

$R^{2'}$ represents alkyl, cycloalkyl, or adamantyl, wherein the alkyl is branched and has 3 or more carbon atoms, and further wherein the cycloalkyl is optionally substituted with 1 or more substituents independently selected from the group consisting of F, Cl, Br, I, alkyl, $NH_2$, NH(alkyl), NH(aralkyl), NH(acyl), NHC(O)O(alkyl), NH(cycloalkyl), O(alkyl), and cycloalkyl;

each $R^3$ independently represents F, Cl, Br, I, $C_{1-5}$ alkyl, $NH_2$, $NO_2$, OH, or O(alkyl);

n represents 0, 1, 2, 3, or 4; and represents an assymetric center on a phosphorous atom;

with the provisos that:
(1) both R are identical; and
(2) when $R^1$ is tert-butyl, R and $R^{2'}$ are not identical;
comprising the following steps:
(1) reacting a compound represented by formula (2):

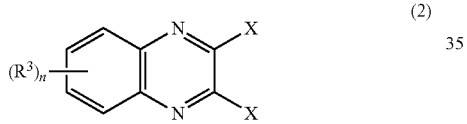

(2)

wherein:
each X independently represents Cl, Br, or I;
each $R^3$ independently represents F, Cl, Br, I, $C_{1-5}$ alkyl, $NH_2$, $NO_2$, OH, or O(alkyl); and
n represents 0, 1, 2, 3, or 4;
with a deprotonated form of a compound represented by formula (3):

(3)

wherein:
each $R^1$ represents alkyl, cycloalkyl, adamantyl, or aryl, wherein each alkyl is branched and has 3 or more carbon atoms, and further wherein each cycloalkyl is optionally substituted with 1 or more substituents independently selected from the group consisting of F, Cl, Br, I, alkyl, $NH_2$, NH(alkyl), NH(aralkyl), NH(acyl), NHC(O)O(alkyl), NH(cycloalkyl), O(alkyl), and cycloalkyl, and each aryl is optionally substituted with 1 or more substituents independently selected from the group consisting of F, Cl, Br, I, alkyl, haloalkyl, $NH_2$, NH(alkyl), N(alkyl)$_2$, O(alkyl), and cycloalkyl, or two vicinal aryl substituents, together with the carbon atoms to which they are attached, form a fused alkylenedioxy moiety;

with the proviso that both $R^1$ are identical;

in the presence of a deboranating agent selected from the group consisting of N,N,N',N'-tetramethylethylenediamine, 1,4-diazabicyclo[2.2.2]octane, triethylamine, tetrafluoroboric acid, and trifluoromethanesulfonic acid, to provide a compound represented by formula (4):

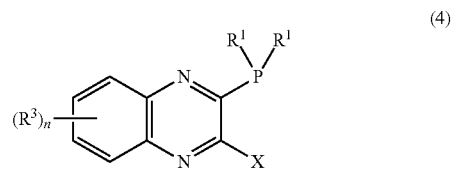

(4)

wherein:
X represents Cl, Br, or I;
each $R^1$ represents alkyl, cycloalkyl, adamantyl, or aryl, wherein each alkyl is branched and has 3 or more carbon atoms, and further wherein each cycloalkyl is optionally substituted with 1 or more substituents independently selected from the group consisting of F, Cl, Br, I, alkyl, $NH_2$, NH(alkyl), NH(aralkyl), NH(acyl), NHC(O)O(alkyl), NH(cycloalkyl), O(alkyl), and cycloalkyl, and each aryl is optionally substituted with 1 or more substituents independently selected from the group consisting of F, Cl, Br, I, alkyl, haloalkyl, $NH_2$, NH(alkyl), N(alkyl)$_2$, O(alkyl), and cycloalkyl, or two vicinal aryl substituents, together with the carbon atoms to which they are attached, form a fused alkylenedioxy moiety;

each $R^3$ independently represents F, Cl, Br, I, $C_{1-5}$ alkyl, $NH_2$, $NO_2$, OH, or O(alkyl); and n represents 0, 1, 2, 3, or 4;

with the proviso that both $R^1$ are identical; and (2) reacting a liquid solvent selected from the group consisting of tetrahydrofuran, N,N-dimethylformamide, cyclopentyl methyl ether, diethyl ether, dibutyl ether, dioxane, hexane, and toluene, or a combination thereof, comprising (a) the compound of formula (4) above, and (b) a compound represented by formula (5'):

(5')

wherein:
$R^{2'}$ represents alkyl, cycloalkyl, or adamantyl, wherein the alkyl is branched and has 3 or more carbon atoms, and further wherein the cycloalkyl is optionally substituted with 1 or more substituents independently selected from the group consisting of F, Cl, Br, I, alkyl, $NH_2$, NH(alkyl), NH(aralkyl), NH(acyl), NHC(O)O(alkyl), NH(cycloalkyl), O(alkyl), and cycloalkyl; and

* represents an assymetric center on a phosphorous atom;

with a base selected from the group consisting of n-butyllithium, sec-butyllithium, lithium diisopropylamide, methylmagnesium bromide, potassium-tert-butoxide, N,N-diisopropylethylamine, potassium hydroxide, and sodium hydroxide, in the presence of a deboranating agent selected from the group consisting of N,N,N',N'-tetramethylethylenediamine, 1,4-diazabicyclo[2.2.2]octane, triethylamine, tetrafluoroboric acid, and trifluoromethanesulfonic acid, to provide the compound represented by formula (1') above.

* * * * *